United States Patent
Halik et al.

(10) Patent No.: US 7,064,176 B2
(45) Date of Patent: *Jun. 20, 2006

(54) COATING MATERIAL FOR ELECTRONIC COMPONENTS

(75) Inventors: Marcus Halik, Erlangen (DE); Klaus Lowack, Erlangen (DE); Recai Sezi, Rottenbach (DE); Andreas Walter, Egloffstein (DE)

(73) Assignee: Infineon Technologies AG, Munich (DE)

( * ) Notice: Subject to any disclaimer, the term of this patent is extended or adjusted under 35 U.S.C. 154(b) by 32 days.

This patent is subject to a terminal disclaimer.

(21) Appl. No.: 10/472,772

(22) PCT Filed: Mar. 28, 2002

(86) PCT No.: PCT/EP02/03577

§ 371 (c)(1),
(2), (4) Date: Feb. 10, 2004

(87) PCT Pub. No.: WO02/079297

PCT Pub. Date: Oct. 10, 2002

(65) Prior Publication Data

US 2004/0138406 A1    Jul. 15, 2004

(30) Foreign Application Priority Data

Mar. 30, 2001   (DE) ............... 101 15 882

(51) Int. Cl.
C08G 73/22    (2006.01)
C08G 69/00    (2006.01)

(52) U.S. Cl. .............. 528/183; 528/327; 528/341; 528/332; 528/310; 528/184; 528/272; 528/347; 528/176; 525/420; 525/432; 525/434

(58) Field of Classification Search .............. 528/170, 528/310, 322, 353, 327, 176, 363, 183, 341
See application file for complete search history.

(56) References Cited

U.S. PATENT DOCUMENTS

| 4,820,793 A | 4/1989 | Imai et al. .............. 528/183 |
| 5,077,378 A | 12/1991 | Mueller et al. .......... 528/185 |
| 6,750,317 B1 * | 6/2004 | Halik et al. ............ 528/310 |
| 6,787,244 B1 * | 9/2004 | Sezi et al. ............. 428/474.4 |
| 6,806,344 B1 * | 10/2004 | Sezi et al. ............. 528/176 |
| 6,835,456 B1 * | 12/2004 | Walter et al. ........... 428/411.1 |
| 6,861,479 B1 * | 3/2005 | Sezi ..................... 525/400 |
| 6,866,980 B1 * | 3/2005 | Sezi ..................... 430/270.1 |

FOREIGN PATENT DOCUMENTS

EP   0 317 942   5/1989
JP   04170431    6/1992

OTHER PUBLICATIONS

Shigeyoshi, Hara and Takeyoshi Yamada, Wire Coating Materials, *Chemical Abstracts*, vol. 83, pp. 142, 1975.

* cited by examiner

*Primary Examiner*—P. Hampton Hightower
(74) *Attorney, Agent, or Firm*—Fish & Richardson P.C.

(57) ABSTRACT

The invention relates to novel polyhydroxyamide compounds that, in the form of their oxazoles, ane suited as a coating material, particularly for electronic components. The invention also relates to a method for producing these novel compounds and to the use thereof.

36 Claims, 2 Drawing Sheets

COATING MATERIAL FOR ELECTRONIC COMPONENTS

TECHNICAL FIELD

The present invention relates to novel polyhydroxyamide compounds which, in the form of their oxazoles, are suitable as a coating material, in particular of electronic components, a process for their preparation and their use.

BACKGROUND

In microelectronics, highly heat-resistant polymers are required as protective and insulating coats. These polymers can be used as a dielectric between chip and metalization or between two metal planes of the chip, e.g. in multichip modules, memory chips and logic chips. The metal planes may be present below or above the inorganic passivation of the chip. Moreover, such polymers can also be used as a buffer coating between the chip and its housing. Among these polymers, the polyhydroxyamides have good solubility in organic solvents and good film formation properties and can be applied to the electronic components by means of the economical spin-coating technique. These polyhydroxyamides are cyclized after a thermal treatment (curing) to give polybenzoxazoles and, according to the following equation, thus acquire their final properties:

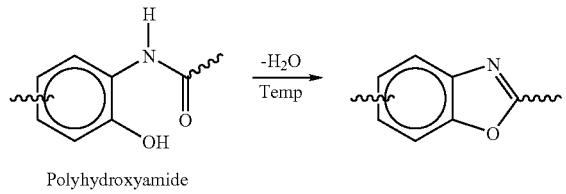

Polyhydroxyamide

The requirements with respect to the end product are, for example, good insulation properties and sufficient thermal stability. Good adhesion of the material to all relevant substrates, for example silica, silicon nitride, titanium, titanium nitride, tantalum or tantalum nitride, is also particularly important. Titanium, titanium nitride, tantalum and tantalum nitride are proven adhesion-promoting and barrier coats for aluminum or copper metalizations.

If the polymer is used as an insulating coat, for example below the uppermost coat of metal, i.e. the outer wiring, further properties are important. These are in particular the adhesion of the metallic conductors or of the corresponding adhesion-promoting and barrier coats to the insulating coat and high resilience or extensibility of this insulating coat so that the different expansions of the chip and of the circuit board are compensated. FIG. 1 shows a flip-chip contact, wherein the upper part of the chip points toward the circuit board. The abovementioned properties are, however, also important in other metalization coats of the chip.

Polyhydroxyamides which are readily soluble and have good thermal stability are described, for example, in EP 0 317 942 A2, DE 3 718 212 A1 or U.S. Pat. No. 5,077,378. However, the materials described in these publications have very low resilience or elongation and only moderate adhesion, in particular to titanium nitride or tantalum nitride.

Chemical Abstracts Vol. 83, 1975, report 81475x describes coating materials for cables, but these are not polyhydroxyamides.

Patent Abstracts of Japan C-991, Oct. 2, 1992, Vol. 16/No. 473 describes fluorinated aromatic polyhydroxyamides and polybenzoxazoles having high thermal stability. Particular adhesion properties of these compounds are not mentioned.

SUMMARY

It is an object of the present invention to provide readily soluble polyhydroxyamides which, after application to a substrate and drying, if required with a thermal treatment, form a heat-stable and highly resilient coat with very good adhesion to metallic and nonmetallic substrates.

It is a further object of the present invention to provide electronic components which have heat-stable and highly resilient coats with very good adhesion to metallic and nonmetallic substrates.

This object is achieved, according to the invention, by polyhydroxyamide compounds as described herein. Preferred embodiments of the invention are evident from the description and the claims.

The present invention furthermore relates to polybenzoxazoles which are obtained by cyclization of hydroxyamide units of the polyhydroxyamides according to the invention, and their use.

The invention also includes electronic components which have the polybenzoxazole coats according to the invention.

The present invention furthermore relates to a preparation process for the polyhydroxyamides according to the invention and the corresponding polybenzoxazoles thereof.

The invention furthermore includes compositions which contain the polyhydroxyamides according to the invention and an organic solvent.

DESCRIPTION

The present invention relates to novel polyhydroxyamides and polybenzoxazoles derived therefrom by cyclization. In the form of their polybenzoxazoles, the compounds according to the invention can be used for coating substrates, in particular electronic components.

According to the invention, compounds of the following formula I or II are claimed:

Formula I:

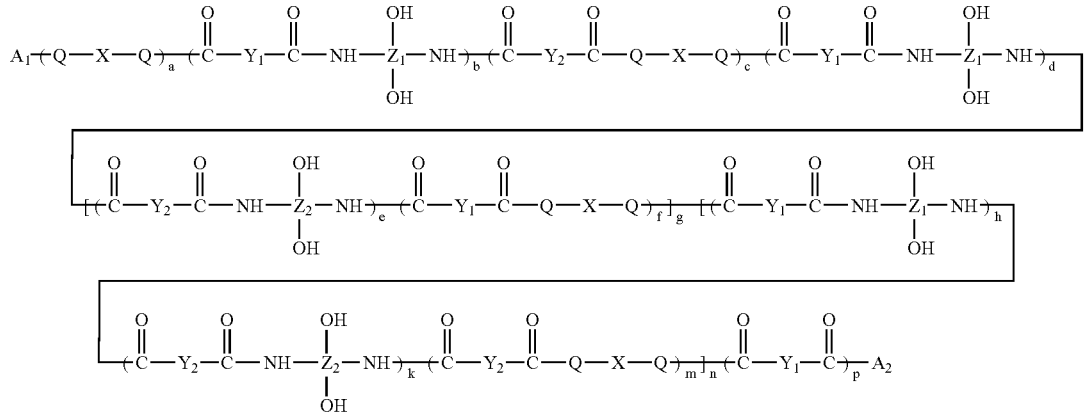

in which:
a=0 or 1, with the proviso that, if a is 0, c must be ≧1,
b=0–100,
c=0–50, with the proviso that, if c is 0, a must be =1,
d=1–100,
e=0–100,
f=0–100,
g=0–50,
h=0–100,
k=0–100,
m=0–100,
n=0–50,
p=0 or 1;

Formula II:

$$A_3 \{ (NH-Z_1(OH)(OH)-NH-C(O)-Y_1-C(O))_q-Q-X-Q-C(O)-Y_1-C(O)-)_r(NH-Z_1(OH)(OH)-NH-C(O)-Y_1-C(O))_s$$
$$[(NH-Z_2(OH)(OH)-NH-C(O)-Y_2-C(O))_t-Q-X-Q-C(O)-Y_1-C(O)-)_u]_v[(NH-Z_1(OH)(OH)-NH-C(O)-Y_1-C(O))_w$$
$$[(NH-Z_2(OH)(OH)-NH-C(O)-Y_2-C(O))_x-Q-X-Q-C(O)-Y_2-C(O)-)_y]_z-NH-Z_2(OH)(OH)-NH-A_3$$

in which:
q=1–100,
r=1–100,
s=0–100,
t=0–100,
u=0–100,
v=0–50,
w=0–100,
x=0–100,
y=0–100,
z=0–50;

X, independently of one another, are:

$X_1$:

$$\{[CH_2-O-C(O)-O-CH_2-R_1]_a[CH_2-O-C(O)-O-CH_2-R_2-CH_2]_\beta\}$$

or $X_2$:

$$-\{(R_1-C(O)-O)_\alpha(R_2-C(O)-O)_\beta\}-R_1-$$

or $X_3$:

$$-\{(R_1-C(O)-O-R_2-O)_\alpha(R_1-C(O)-O)_\beta\}-R_1-$$

or $X_4$:

$$-(R_1-O)_\alpha(R_2-O)_\beta-R_1-$$

or $X_5$:

$$-\{(R_1-C(O))_\alpha(R_2-C)_\beta\}-R_1-$$

or $X_6$:

$$-\{(R_1-C(O)-NH)_\alpha(R_2-C(O)-NH)_\beta\}-R_1-$$

in which $R_1$ in each case may be identical to or different from $R_2$ and $\alpha$ is 0–100 and $\beta$ is 0–100, $\alpha$ and $\beta$ not simultaneously being 0;

$R_1$ and $R_2$ are:
substituted or unsubstituted alkylene, arylene or cycloalkylene groups;

Q is —O—, —S— and/or —NH—;

$A_1$ and/or $A_2$, where $A_1$ may be identical to or different from $A_2$ if $A_1$ and/or $A_2$ are bonded to Q or —NH—, are:
H, substituted or unsubstituted alkylcarbonyl, alkenylcarbonyl, cycloalkenylcarbonyl, arylcarbonyl, aralkylcarbonyl, aralkenylcarbonyl or aralkynylcarbonyl, it being possible for the carbonyl group to be bonded to the aromatic or to the alkyl or alkenyl or alkynyl group;

$A_1$ and/or $A_2$, where $A_1$ may be identical to or different from $A_2$ if $A_1$ and/or $A_2$ are bonded to —CO—, are:

hydroxyl, substituted or unsubstituted alkoxy, alkenyloxy, aryloxy, cycloalkenyloxy, amino, alkylamino, alkenylamino, arylamino, arylalkenyloxy, arylalkylamino;

$A_3$ is:

H, substituted or unsubstituted alkylcarbonyl, alkenylcarbonyl, cycloalkenylcarbonyl, arylcarbonyl, aralkylcarbonyl, aralkenylcarbonyl or aralkynylcarbonyl, it being possible for the carbonyl group to be bonded to the aromatic or to the alkyl or alkenyl or alkynyl group;

$Y_1$ and $Y_2$, where $Y_1$ may be identical to or different from $Y_2$, are:

substituted or unsubstituted aryl, a substituted or unsubstituted polynuclear aromatic hydrocarbon compound, substituted or unsubstituted alkyl, alkenyl, alkynyl, aryl or aralkyl, aralkenyl, aralkynyl;

$Z_1$ and $Z_2$, where $Z_1$ may be identical to or different from $Z_2$, are:

aryl, aralkyl, aralkenyl, aralkynyl, heteroaryl or a polynuclear aromatic hydrocarbon compound.

According to the invention, $X_1$ to $X_6$ may be identical to or different from one another. According to the invention, polyhydroxyamides where $X=X_1$ and/or $X=X_3$ are preferred. It is furthermore preferred according to the invention if, in X, $\alpha$ is 0–10 and/or $\beta$ is 0–10. In the polyhydroxyamides according to the invention, it is preferable if, in formula I, b=0–20, c=0–10, d=4–40, e=0–20, f=0–20, g=0–10, h=0–20, k=0–20, m=0–20 and/or n=0–10;

and in formula II, q=3–40, r=1–40, s=0–40, t=0–20, u=0–20, v=0–10, w=0–20, x=0–20, y=0–20 and/or z=0–10.

According to the invention, polyhydroxyamides in which $R_1$ and/or $R_2$ have the following meaning are furthermore preferred:

—(CH$_2$)$_\chi$—

$\chi$=1–20

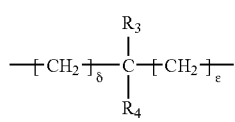

where $\delta$=0–20, $\epsilon$=0–20, and $R_3$ and $R_4$: —H, —(CH$_2$)$_\phi$—CH$_3$;

$\phi$=0–10 or —OH, where $R_3$ and $R_4$ cannot simultaneously be —OH

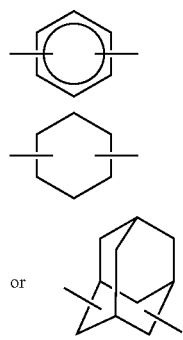

or

The following radicals are particularly preferred for $R_1$ and/or $R_2$:

—(CH$_2$)$_\chi$—

$\chi$=1–20

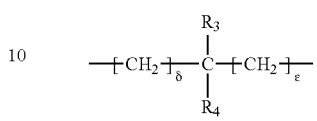

where $\delta$=0–20, $\epsilon$=0–20, and $R_3$ and $R_4$: —H, —(CH$_2$)$_\phi$—CH$_3$;

$\phi$=0–10 or —OH, where $R_3$ and $R_4$ cannot simultaneously be —OH

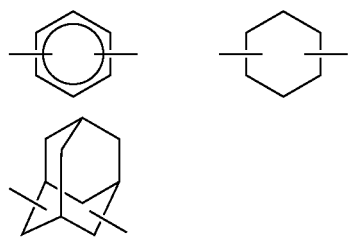

or

According to the invention, Q is preferably —O— and/or —NH—, furthermore preferably —O— and —NH—.

According to the invention, further preferred polyhydroxyamides are those in which $A_1$ and/or $A_2$, if $A_1$ and/or $A_2$ are bonded to Q or —NH—, and $A_3$ have the following meaning:

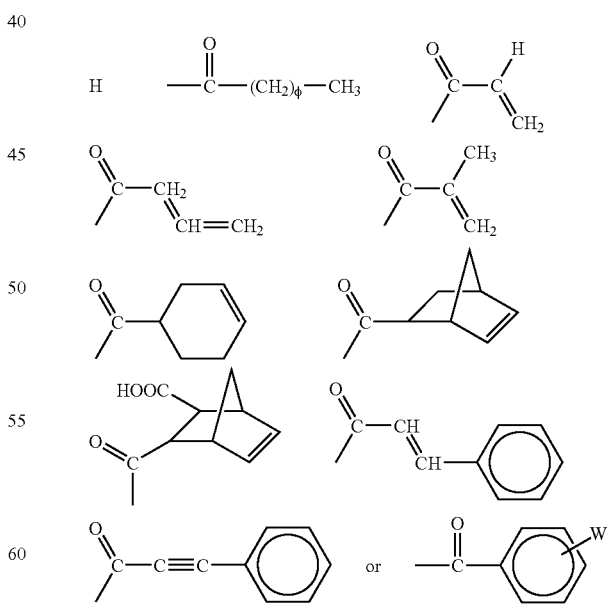

where $\phi$=0–10 and W=—CN, —C(CH$_3$)$_3$, —(CH$_2$)$_\phi$—CH$_3$, —(CF$_2$)$_{100}$—CF$_3$, —O—(CH$_2$)$_{100}$—CH$_3$, —O—(CF$_2$)$_\phi$—CF$_3$, —CH=CH₂, —C≡CH or

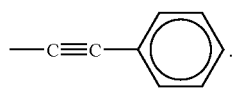

Among these, the following are particularly preferred:

H, 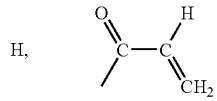 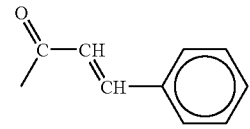

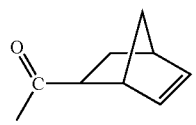 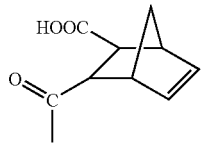

or 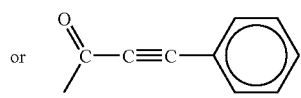

If $A_1$ and/or $A_2$ are bonded to —CO—, $A_1$ and/or $A_2$ preferably have the following meaning:

—OH  —O—(CH₂)ᵩ—CH₃  —O—CH₂—CH=CH₂

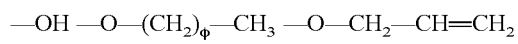

—NH₂  —NH—(CH₂)ᵩCH₃  —NH—CH₂—CH=CH₂

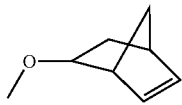

where ϕ=0–10 and W=—CN, —C(CH₃)₃, —(CH₂)ᵩ—CH₃, —(CF₂)ᵩ—CF₃, —O—(CH₂)ᵩ—CH₃, —O—(CF₂)ᵩ—CF₃, —CH=CH₂, —C≡CH or

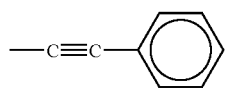

Among these, the radicals —OH and —NH₂ are particularly preferred.

$Y_1$ and $Y_2$, where $Y_1$ may be identical to or different from $Y_2$, are preferably:

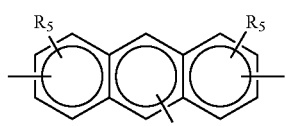

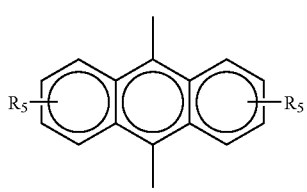

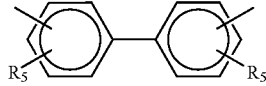

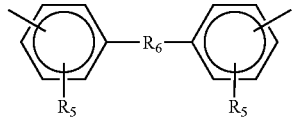

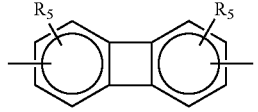

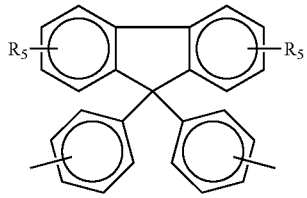

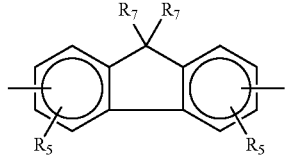

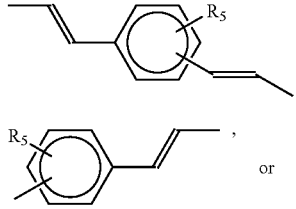

or

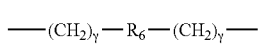

($\gamma = 1 = 10$)
if $R_6 = $ —CH₂—,
then $\gamma = 0$–10

$Y_1$ and/or $Y_2$ are particularly preferably:

[structures: phenyl with $R_5$ substituents; naphthyl with $R_5$; anthracene with $R_5$; biphenyl with $R_5$; two phenyls linked by $R_6$ with $R_5$ substituents]

—(CH$_2$)$_\gamma$—R$_6$—(CH$_2$)$_\gamma$—

($\gamma = 1 = 10$)
if R$_6$ = —CH$_2$—,
then $\gamma = 0$–10

According to the invention, preferred polyhydroxyamides are those in which the radical $R_5$ in $Y_1$ and/or $Y_2$ is —H, —CN, —C(CH$_3$)$_3$, —(CH$_2$)$_\phi$—CH$_3$, —(CF$_2$)$_\phi$—CF$_3$, —O—(CH$_2$)$_\phi$—CH$_3$, —O—(CF$_2$)$_\phi$—CF$_3$ and/or is:

—C≡CH

—C≡C—[phenyl]

—O—CH$_2$—CH=CH$_2$

[acrylate structure: —O—C(=O)—C(H)=CH$_2$]

[methacrylate structure: —O—C(=O)—C(CH$_3$)=CH$_2$]

[cinnamate structure: —O—C(=O)—CH$_2$—CH=CH$_2$]

[norbornene ester]

[cyclohexene ester]

-continued

[cinnamate aromatic: —O—C(=O)—CH=CH—phenyl]

[tolyl-W]

[phenylpropiolate: —O—C(=O)—C≡C—phenyl]

[tolyl]

—O—[phenyl]

[—O—C(=O)—phenyl—W] or

—O—[phenyl—W]

where $\phi = 0$–10 and W= —CN, —C(CH$_3$)$_3$, —(CH$_2$)$_\phi$—CH$_3$, —(CF$_2$)$_\phi$—CF$_3$, —O—(CH$_2$)$_\phi$—CH$_3$, —O—(CF$_2$)$_\phi$—CF$_3$, —CH=CH$_2$, —C≡CH or —C≡C—[phenyl]

Particularly preferred radicals $R_5$ are:

—C≡CH

—C≡C—[phenyl]    [acrylate]

[methacrylate]    or    [norbornene ester]

According to the invention, $R_6$ in $Y_1$ and/or $Y_2$ is preferably —O—, —CO—, —NR$_7$—, —S—, —SO$_2$—, —S$_2$—, —CH$_2$— or:

—C=C— —C≡C—

—(CF$_2$)$_\eta$—    —C(R$_6$)$_2$—    —C(CF$_3$)$_2$—    —Si(R$_6$)$_2$—

$\eta = 1$–10

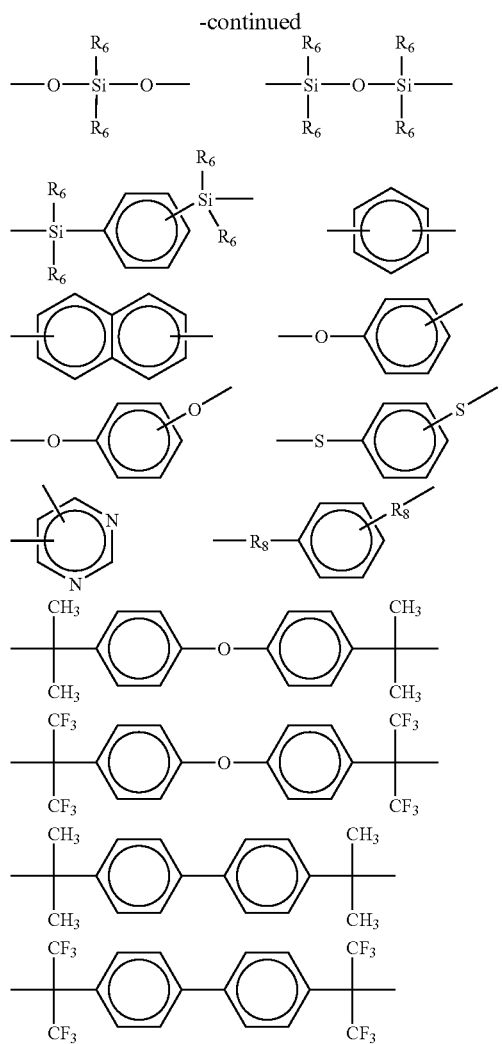

Particularly preferred radicals $R_6$ among these are: —O—, —CO—, —NR$_7$—, —CH$_2$— and:

—(CF$_2$)$_\eta$—

$\eta = 1-10$

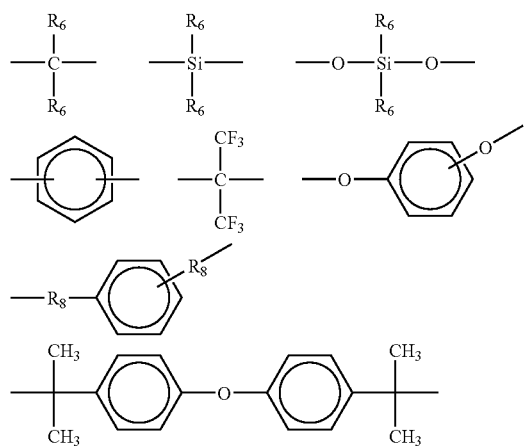

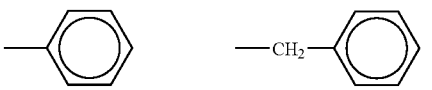

According to the invention, $R_7$ in $Y_1$ and/or $Y_2$ is preferably —H and/or:

—(CH$_2$)$_\phi$—CH$_3$ ($\phi = 0-10$)

—(CF$_2$)$_\phi$—CF$_3$ ($\phi = 0-10$)

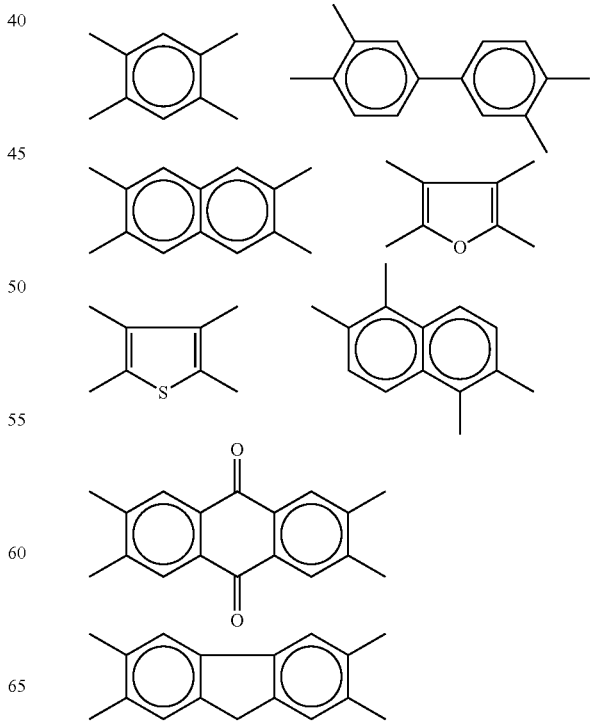

When it denotes $R_6$, $R_8$ is, according to the invention, preferably alkyl having 1 to 10 carbon atoms or aryl.

According to the invention, $Z_1$ and $Z_2$ are preferably the following radicals, it being possible for $Z_1$ to be identical to or different from $Z_2$:

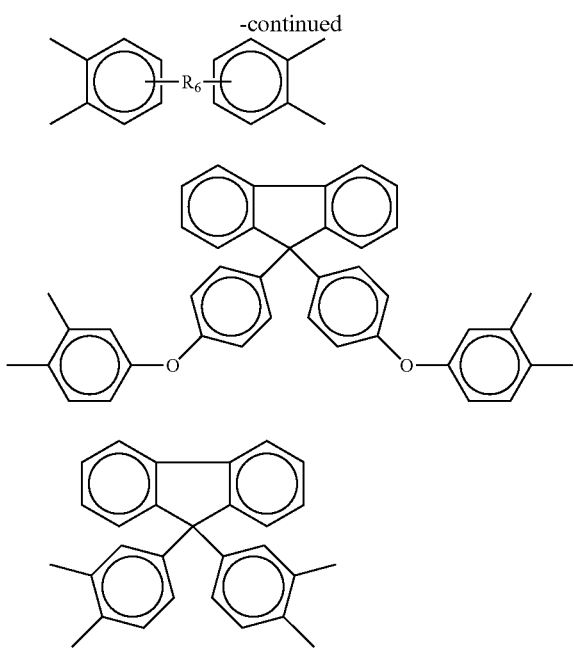

Here, $R_6$ is defined as above.

Particularly preferred radicals $Z_1$ and/or $Z_2$ are:

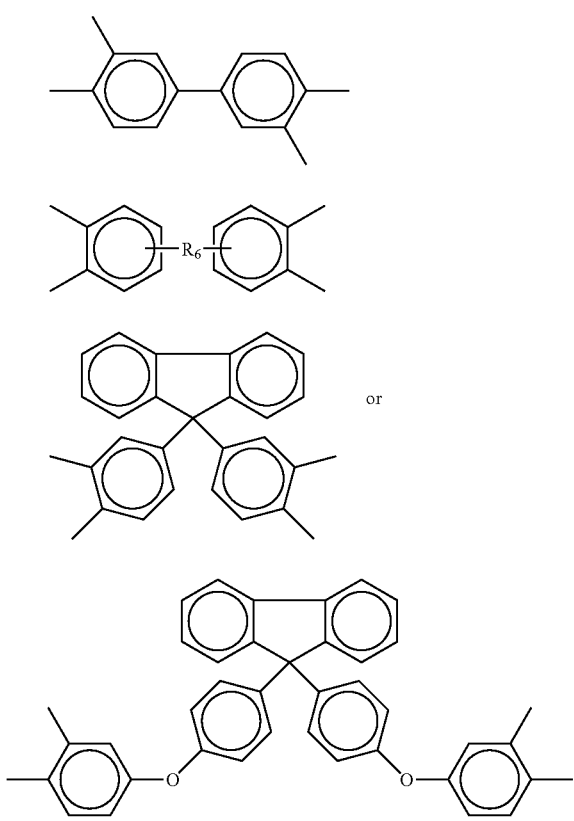

The polyhydroxyamides according to the invention can be substantially controlled with respect to the indices by the stoichiometry of the reactants or the prepolymerization. The characterization of the polyhydroxyamides is expediently effected by means of $^1$H-NMR, gel permeation chromatography (GPC) and/or thermogravimetry (TGA). On the basis of the different chemical shifts of individual protons of the individual components and the corresponding integrals, the indices of the individual components can be substantially determined via the molar mass distribution of the polymer (obtained by GPC).

The polyhydroxyamides of the present invention can also be converted into polybenzoxazoles by cyclization of hydroxyamide units. According to the invention, polybenzoxazoles are to be understood as meaning those compounds which are obtained by cyclization of the hydroxyamide units of the compounds according to the invention. According to the invention, the term includes not only oxazole rings which are present in the vicinity of phenyl rings but alternatively also those compounds in which the oxazole ring is present, for example, in the vicinity of thiophene or furan rings.

These polybenzoxazoles also included according to the invention have outstanding adhesion to metallic and non-metallic substrates, in particular to silica, silicon nitride, titanium, titanium nitride, tantalum or tantalum nitride. The polybenzoxazoles according to the invention are moreover extremely heat-resistant and can be used as protective and/or insulating coats in microelectronics. A further particular advantage is the high resilience or extensibility of the polybenzoxazole insulating coats of the present invention. The following may be mentioned as examples of electronic components that have a polybenzoxazole coat according to the invention: flip-chips, memory chips, logic chips, flash memories, multichip modules, circuit boards, microprocessors, and embedded DRAMs.

The polyhydroxyamides according to the invention can be prepared by conventional processes. Here, a compound of the formula $Z_1(NH_2)_2(OH)_2$ and/or $Z_2(NH_2)_2(OH)_2$ is reacted with a compound of the formula $Y_1(COCl)_2$ and/or $Y_2(COCl)_2$, which is preferably used in excess, and the product obtained is then reacted with a compound of the formula $X(QOH)_2$ or $X(QNH_2)_2$ and the product obtained thereby is then optionally reacted with a precursor compound for $A_1$, $A_2$ and/or $A_3$, $A_1$, $A_2$ and/or $A_3$ being bonded at the chain ends. Here, $Z_1$, $Z_2$, $Y_1$, $Y_2$, X, $A_1$, $A_2$ and $A_3$ are defined as above. The fact that $A_1$, $A_2$ and/or $A_3$ are bonded at the chain ends is evident simply from the fact that the products can be completely cyclized. Products which cannot be completely cyclized are still partly soluble after the cyclization treatment, i.e. swell, which does not occur in the case of completely cyclized products.

For the synthesis of copolymers where $Y_1$ is different from $Y_2$, a mixture of $Y_1(COCl)_2$ and $Y_2(COCl)_2$ can be reacted with $Z_1(NH_2)_2(OH)_2$ or $Z_2(NH_2)_2(OH)_2$, the stoichiometry of total Y being appropriately distributed over $Y_1$ and $Y_2$. A reaction with $X(QOH)_2$ or $X(QNH_2)_2$ is then effected.

Another possibility for the preparation of copolymers mixed with respect to $Z_1$, $Z_2$, $Y_1$ and $Y_2$ is to prepolymerize two separate batches in which, for example, on the one hand $Y_1$ and $Z_1$ and on the other hand $Y_2$ and $Z_2$ are combined. The two batches are then combined and are polymerized with $X(OH)_2$. Blocks, for example according to the scheme -$Z_1$-$Y_1$—X—$Y_2$-$Z_2$-, can thus be prepared in a defined manner.

The synthesis gives straight-chain polyhydroxyamides, as can be shown by $^1$H-NMR spectroscopy (cf. example 4 and FIG. 2). Moreover, crosslinked chains would not give good solubility, as in the examples according to the invention.

The conversion of polyhydroxyamides into polybenzoxazoles is usually effected by a thermal treatment (curing). This thermal treatment is effected, according to the invention, at 250–450° C., preferably 300–400° C., most preferably at about 300–350° C.

The thermal treatment usually takes 0.5–3 hours, preferably 1–3 hours, most preferably 1–2 hours.

The invention also relates to a process for coating substrates, the polyhydroxyamides according to the invention being applied to the substrate to be coated, and the coated substrate then being heated in order to form a polybenzoxazole coat on the substrate. During the heating, the above parameters for the thermal treatment are preferably used.

The polymers according to the invention are readily soluble in many organic solvents, e.g. acetone, cyclohexanone, diethylene glycol mono- or diethyl ether, N-methylpyrrolidone, γ-butyrolactone, ethyl lactate, tetrahydrofuran or ethyl acetate, and can be applied without problems to substrates by means of conventional methods, for example the spin coating technique. After the thermal treatment (curing) of the substrate provided with the polyhydroxyamides, the film obtained exhibits substantially higher resilience or extensibility and substantially better adhesion to various substrates, in particular to titanium, titanium nitride, tantalum and tantalum nitride, in comparison with other comparable materials.

The invention also relates to compositions which contain the polyhydroxyamides according to the invention in an organic solvent, preferably in one of the solvents acetone, cyclohexanone, diethylene glycol mono- or diethyl ether, N-methylpyrrolidone, γ-butyrolactone, ethyl lactate, tetrahydrofuran, ethyl acetate or mixtures thereof. According to the invention, compositions in which the polyhydroxyamide is present in an amount of 10–50% by weight, more preferably 20–40% by weight, most preferably about 20% by weight, based on the total composition, are preferred.

The substrates which were coated using the novel material according to the invention withstand a substantially larger number of thermal cycles than those which were produced using materials according to the prior art. Suitable substrates for the polymers according to the invention are, for example, silicon chips (1) which have the insulating material (2) according to the invention with a metal coat (3) present thereon and are (spot) soldered (5) or adhesively bonded with a conductive adhesive to a circuit board (4) (cf. FIG. 1).

The polybenzoxazole coats according to the invention preferably serve, according to the invention, as protective and/or insulating coats in electrical components.

The invention is described in more detail below with reference to embodiments. However, these are not intended to limit the scope of the present invention.

DETAILED DESCRIPTION

Figure 1:
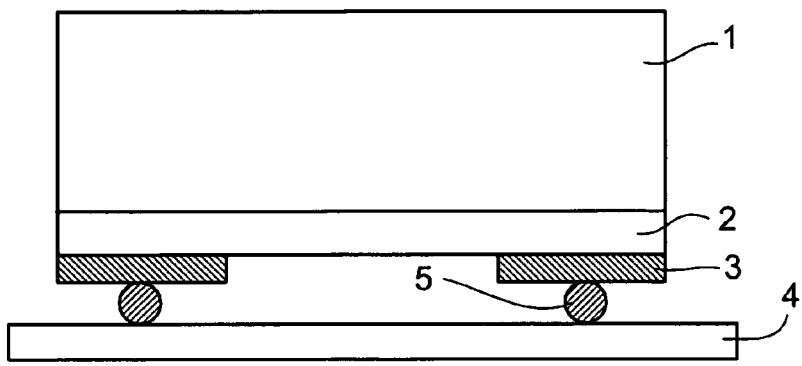
FIG. 1 shows the structure of a flip-chip contact.

Chemicals Used:

Bisaminophenols:

9,9'-Bis(4-((3-hydroxy-4-amino)phenoxy)phenyl)fluorene [sic]—(bisaminophenol 1)

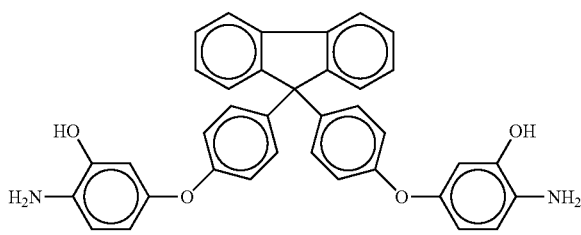

2,2-Bis(3-amino-4-hydroxyphenyl)hexafluoropropane—(bisaminophenol 2)

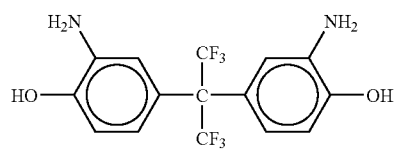

3,3'-Diamino-4,4'-dihydroxybiphenyl—(bisaminophenol 3)

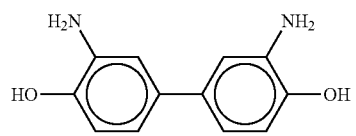

Bisaminophenol 4:

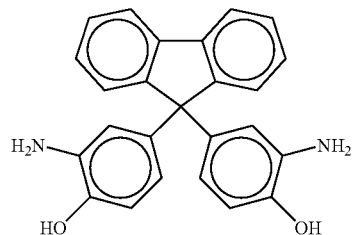

Bisaminophenol 5: 3,3'-dihydroxybenzidine

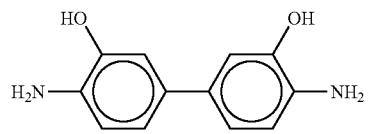

Dicarboxylic acid chlorides:

5-Ethynylisophthaloyl chloride—(dicarboxylic acid chloride 1)

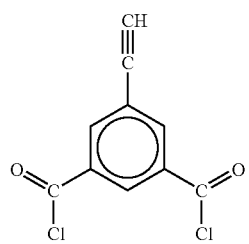

4,4'-Di(chlorocarbonyl)diphenyl ether—(dicarboxylic acid chloride 2)

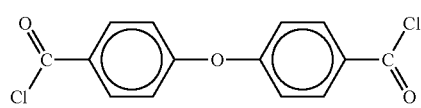

Terephthaloyl chloride—(dicarboxylic acid chloride 3)

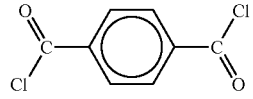

Isophthaloyl chloride—(dicarboxylic acid chloride 4)

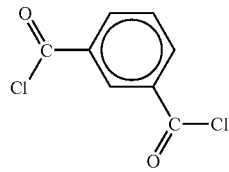

1,8-Anthracenedicarboxylic acid chloride (dicarboxylic acid chloride 5)

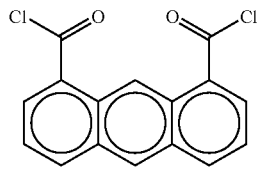

2,6-Naphthalenedicarboxylic acid chloride (dicarboxylic acid chloride 6)

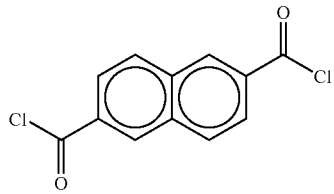

Endcap:

cis-5-Norbornene-endo-2,3-dicarboxylic anhydride—(endcap 1)

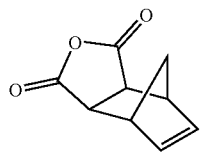

Methacryloyl chloride (endcap 2)

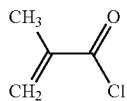

Bishydroxycarbonates:

UC-Carb 100 (UBE Industries, LTD.)—(bishydroxycarbonate 1)

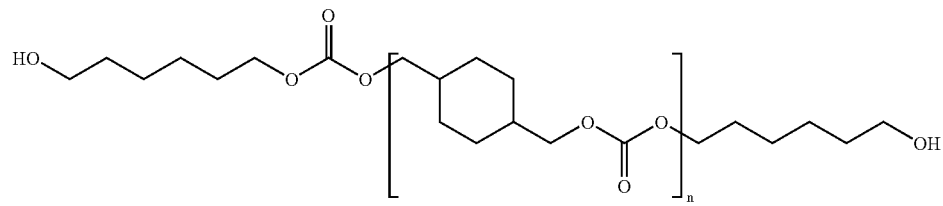

n=3–6

UH-Carb 300 (UBE Industries, LTD.)—(bishydroxycarbonate 2)

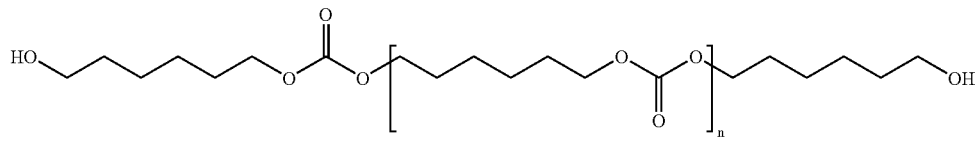

n=10–14

Bishydroxyester:

Poly[di(ethylene glycol)phthalate]diol—(bishydroxyester 1)

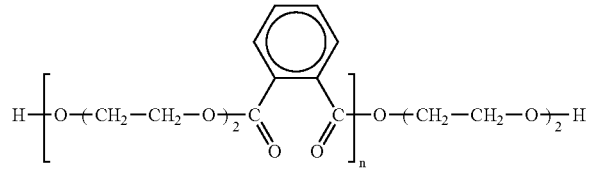

n=2–4

Bishydroxyether:

Poly(ethylene glycol-co-propylene glycol)-polyether 1 M=2 500 g/mol

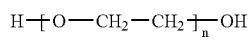

n=10–80

EXAMPLES

Synthesis of polyhydroxyamides according to the invention (examples 1–9)

Example 1

Polyhydroxyamide 1

10 g (17.7 mmol) of bisaminophenol 1 were dissolved in 100 ml of distilled N-methylpyrrolidone (NMP). A solution of 4.83 g (21.25 mmol) of dicarboxylic acid chloride 1 in 50 ml of distilled γ-butyrolactone (γ-BL) was added dropwise to this solution at 10° C. while stirring. Stirring was continued for a further hour at 10° C. and then for 1 hour at 20° C. A solution of 7.08 g (7.08 mmol) of bishydroxycarbonate 1 in 60 ml of distilled NIvIP was then added dropwise at 10° C. The reaction solution was stirred for a further 1.5 hours at 10° C. and then for 12 hours at 20° C. After cooling again to 10° C., 5.4 g (52.3 mmol) of triethylamine, dissolved in 20 ml of NMP, were added to the reaction mixture, which was warmed up to room temperature and stirred for 2 hours. In order to isolate the polymer, the reaction mixture was filtered and the filtrate was added dropwise to 2500 ml of 2-propanol. The precipitated polymer was filtered off with suction and washed twice in 1000 ml portions of cold demineralized water and once in 2000 ml of demineralized water at 80° C., filtered off, and dried for 72 hours at 50° C./10 mbar. The yield was 19.3 g.

The polyhydroxyamide prepared in this manner was readily soluble in solvents such as NMIP, γ-BL, tetrahydrofuran, cyclohexanone, cyclopentanone and diethylene glycol monomethyl ether.

Example 2

Polyhydroxyamide 2

183.13 g (0.5 mol) of bisaminophenol 2 were dissolved in 600 ml of distilled NMP. A solution of 177.07 g (0.6 mol) of dicarboxylic acid chloride 2 in 550 ml of distilled γ-BL was added dropwise to this solution at 10° C. while stirring. Stirring was effected for 1 hour at 10° C. and then for 1 hour at 20° C. A solution of 115.12 g (0.2 mol) of bishydroxyester I in 250 ml of distilled γ-BL was then added dropwise at 10° C. The reaction solution was stirred for a further 1.5 hours at 10° C. and then for 12 hours at 20° C. After cooling again to 10° C., 129.4 g (1.6 mol) of pyridine, dissolved in 450 ml of γ-BL, were added to the reaction mixture, which was warmed up to room temperature and stirred for 2 hours.

In order to isolate the polymer, the reaction mixture was filtered and the filtrate was added dropwise to a mixture of 3000 ml of demineralized water and 1000 ml of 2-propanol. The precipitated polymer was filtered off with suction and washed twice in 2000 ml portions of cold demineralized water and once in 1000 ml of demineralized water at 80° C., filtered off, and dried for 72 hours at 50° C./10 mbar. The yield was 356.7 g.

The polyhydroxyamide prepared in this manner was readily soluble in solvents such as NMP, γ-BL, tetrahydrofuran, cyclohexanone, cyclopentanone and diethylene glycol monomethyl ether. The molar mass of the polyhydroxyamide 2 was about 42000 (GPC). This gave the following values for the coefficients of the general formula for this example: a=1; b–k=0; m=70–80 (based on the molar mass distribution); n=0; p=1.

Example 3

Polyhydroxyamide 3

6.14 g (28.37 mmol) of bisaminophenol 3 were dissolved in 100 ml of distilled NMP. A solution of 7.00 g (30.83 mmol) of dicarboxylic acid chloride 1 in 50 ml of distilled γ-BL was added dropwise to this solution at 10° C. while stirring. Stirring was effected for a further hour at 10° C. and then for 1 hour at 20° C. A solution of 6.79 g (3.39 mmol) of bishydroxycarbonate 2 in 60 ml of distilled NMP was then added dropwise at 10° C. The reaction solution was stirred for a further 1.5 hours at 10° C. and then for 12 hours at 20° C. After cooling again to 10° C., 7.78 g (77.10 mmol)

of triethylamine, dissolved in 20 ml of NMP, were added to the reaction mixture, which was warmed up to room temperature and stirred for 2 hours.

In order to isolate the polymer, the reaction mixture was filtered and the filtrate was added dropwise to 1500 ml of 2-propanol. The precipitated polymer was filtered off with suction and washed twice in 2000 ml portions of cold demineralized water and once in 1000 ml of demineralized water at 80° C., filtered off, and dried for 72 hours at 50° C./10 mbar. The yield was 17.74 g.

The polyhydroxyamide prepared in this manner was readily soluble in solvents such as NMP, γ-BL, tetrahydrofuran, cyclohexanone, cyclopentanone and diethylene glycol monomethyl ether.

Example 4

Polyhydroxyamide 4

5.00 g (8.86 mmol) of bisaminophenol 1 were dissolved in 70 ml of distilled N-methylpyrrolidone (NMP). A solution of 2.25 g (11.07 mmol) of dicarboxylic acid chloride 3 in 50 ml of distilled γ-butyrolactone (γ-BL) was added dropwise to this solution at 10° C. while stirring. Stirring was effected for a further hour at 10° C. and then for 1 hour at 20° C. A solution of 2.55 g (4.43 mmol) of bishydroxyester 1 in 40 ml of distilled NMP was then added dropwise at 10° C. The reaction solution was stirred for a further 1.5 hours at 10° C. and then for 12 hours at 20° C. After cooling again to 10° C., 2.78 g (27.5 mmol) of triethylamine, dissolved in 20 ml of γ-BL, were added to the reaction mixture, which was warmed up to room temperature and stirred for 2 hours. In order to isolate the polymer, the reaction mixture was filtered and the filtrate was added dropwise to 1500 ml of 2-propanol. The precipitated polymer was filtered off with suction and washed twice in 1000 ml portions of cold demineralized water and once in 1000 ml of demineralized water at 80° C., filtered off, and dried for 72 hours at 50° C./10 mbar. The yield was 8.92 g. The polyhydroxyamide prepared in this manner was readily soluble in solvents such as NMP, γ-BL, tetrahydrofuran, cyclohexanone, cyclopentanone and diethylene glycol monomethyl ether.

Figure 2:
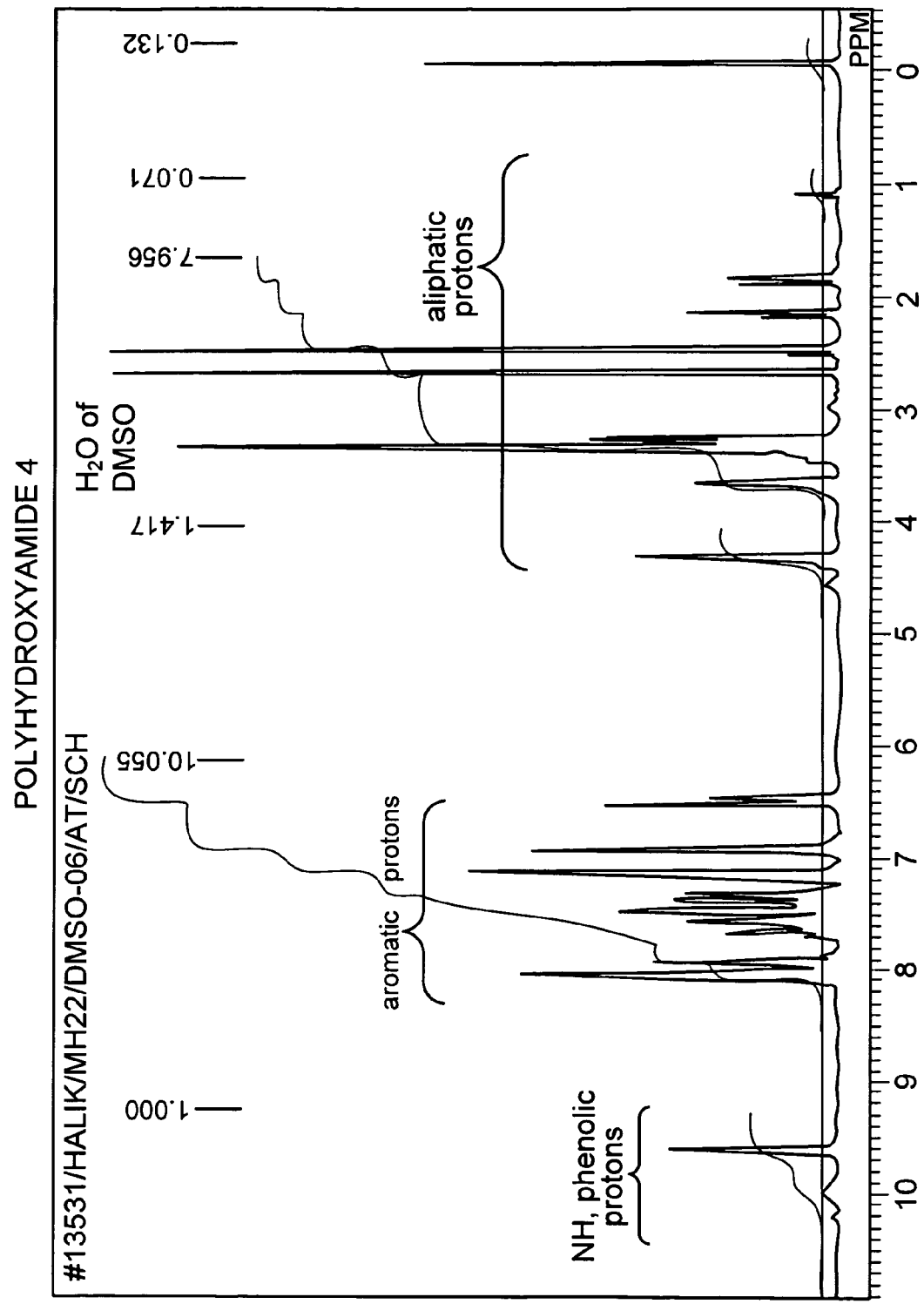
FIG. 2 shows a 1H-NMR spectrum of the polyhydroxyamide from example 4.

FIG. 2 shows a 1H-NMR spectrum of the polyhydroxyamide 4 prepared. The presence of phenolic protons shows that the bishydroxyester 1 did not react with the phenolic protons of the bisaminophenol, i.e. unbranched chains form and not crosslinked products. Crosslinked products would also not have the good solubility like the products according to the invention.

Example 5

Polyhydroxyamide 5

183.12 g (0.5 mol) of bisaminophenol 2 were dissolved in 600 ml of distilled NMP. A solution of 177.07 g (0.6 mol) of dicarboxylic acid chloride 2 in 550 ml of distilled γ-BL was added dropwise to this solution at 10° C. while stirring. Stirring was effected for a further hour at 10° C. and then for 1 hour at 20° C. A solution of 400.6 g (0.2 mol) of bishydroxycarbonate 2 in 250 ml of distilled γ-BL was then added dropwise at 10° C. The reaction solution was stirred for a further 1.5 hours at 10° C. and then for 12 hours at 20° C. After cooling again to 10° C., 129.4 g (1.6 mol) of pyridine, dissolved in 450 ml of γ-BL, were added to the reaction mixture, which was warmed up to room temperature and stirred for 2 hours.

In order to isolate the polymer, the reaction mixture was filtered and the filtrate was added dropwise to a mixture of 3000 ml of demineralized water and 1000 ml of 2-propanol. The precipitated polymer was filtered off with suction and washed twice in 2000 ml portions of cold demineralized water and once in 1000 ml of demineralized water at 80° C., filtered off, and dried for 72 hours at 50° C./10 mbar. The yield was 342.3 g.

The polyhydroxyamide prepared in this manner was readily soluble in solvents such as NMP, γ-BL, tetrahydrofuran, cyclohexanone, cyclopentanone and diethylene glycol monomethyl ether.

Example 6

Polyhydroxyamide 6

7.89 g (36.49 mmol) of bisaminophenol 3 were dissolved in 100 ml of distilled NMP. A solution of 8.00 g (39.40 mmol) of dicarboxylic acid chloride 4 in 50 ml of distilled γ-BL was added dropwise to this solution at 10° C. while stirring. Stirring was effected for a further hour at 10° C. and then for 1 hour at 20° C. A solution of 7.50 g (13.02 mmol) of bishydroxyester 1 in 60 ml of distilled NMP was then added dropwise at 10° C. The reaction solution was stirred for a further 1.5 hours at 10° C. and then for 12 hours at 20° C. After cooling again to 10° C., 9.97 g (98.70 mmol) of triethylamine, dissolved in 20 ml of NMP, were added to the reaction mixture, which was warmed up to room temperature and stirred for 2 hours.

In order to isolate the polymer, the reaction mixture was filtered and the filtrate was added dropwise to 1500 ml of 2-propanol. The precipitated polymer was filtered off with suction and washed twice in 2000 ml portions of cold demineralized water and once in 1000 ml of demineralized water at 80° C., filtered off, and dried for 72 hours at 50° C./10 mbar. The yield was 21.52 g.

The polyhydroxyamide prepared in this manner was readily soluble in solvents such as NMP, γ-BL, tetrahydrofuran, cyclohexanone, cyclopentanone and diethylene glycol monomethyl ether.

Example 7

Polyhydroxyamide 7

7.00 g (32.40 mmol) of bisaminophenol 4 were dissolved in 100 ml of distilled NMP. A solution of 8.22 g (40.50 mmol) of dicarboxylic acid chloride 4 in 50 ml of distilled γ-BL was added dropwise to this solution at 10° C. while stirring. Stirring was effected for a further hour at 10° C. and then for 1 hour at 20° C. A solution of 9.40 g (16.20 mmol) of bishydroxyester 1 in 60 ml of distilled NMP was then added dropwise at 10° C. The reaction solution was stirred for a further 1.5 hours at 10° C. and then for 12 hours at 20° C. After cooling again to 10° C., 10.20 g (101.0 mmol) of triethylamine, dissolved in 20 ml of NMP, were added to the reaction mixture, which was warmed up to room temperature and stirred for 2 hours.

In order to isolate the polymer, the reaction mixture was filtered and the filtrate was added dropwise to 1500 ml of 2-propanol. The precipitated polymer was filtered off with suction and washed twice in 2000 ml portions of cold demineralized water and once in 1000 ml of demineralized water at 80° C., filtered off, and dried for 72 hours at 50° C./10 mbar. The yield was 13.5 g.

The polyhydroxyamide prepared in this manner was readily soluble in solvents such as NMP, γ-BL, tetrahydrofuran, cyclohexanone, cyclopentanone and diethylene glycol monomethyl ether.

Example 8

Polyhydroxyamide 8

10 g (26.28 mmol) of bisaminophenol 4 were dissolved in 100 ml of distilled N-methylpyrrolidone (NMP). A solution of 9.56 g (31.54 mmol) of dicarboxylic acid chloride 1 in 50 ml of distilled g-butyrolactone (γ-BL) was added dropwise to this solution at 10° C. while stirring. Stirring was effected for a further hour at 10° C. and then for 1 hour at 20° C. A solution of 10.51 g (10.51 mmol) of bishydroxycarbonate 1 in 60 ml of distilled NMP was then added dropwise at 10° C. The reaction solution was stirred for a further 1.5 hours at 10° C. and then for 12 hours at 20° C. After cooling again to 10° C., 7.96 g (78.5 mmol) of triethylamine, dissolved in 20 ml of NMP, were added to the reaction mixture, which was warmed up to room temperature and stirred for 2 hours.

In order to isolate the polymer, the reaction mixture was filtered and the filtrate was added dropwise to 2500 ml of 2-propanol. The precipitated polymer was filtered off with suction and washed twice in 1000 ml portions of cold demineralized water and once in 2000 ml of demineralized water at 80° C., filtered off, and dried for 72 hours at 50° C./10 mbar. The yield was 18.8 g. The polyhydroxyamide prepared in this manner was readily soluble in solvents such as NMP, γ-BL, tetrahydrofuran, cyclohexanone, cyclopentanone and diethylene glycol monomethyl ether.

Example 9

Polyhydroxyamide 9

12.00 g (21.25 mmol) of bisaminophenol 1 were dissolved in 130 ml of distilled N-methylpyrrolidone (NMP). A solution of 3.55 g (15.66 mmol) of dicarboxylic acid chloride 1 and 1.70 g (6.71 mmol) of dicarboxylic acid chloride 8 (70:30) in 50 ml of distilled g-butyrolactone (γ-BL) was added dropwise to this solution at 10° C. while stirring. Stirring was effected for a further hour at 10° C. and then for 1 hour at 20° C. A solution of 11.50 g (5.75 mmol) of bishydroxycarbonate 2 in 60 ml of distilled NMP was then added dropwise at 10° C. The reaction solution was stirred for a further 1.5 hours at 10° C. and then for 12 hours at 20° C. After cooling again to 10° C., 5.65 g (55.93 mmol) of triethylamine, dissolved in 20 ml of NMP, were added to the reaction mixture, which was warmed up to room temperature and stirred for 2 hours.

In order to isolate the polymer, the reaction mixture was filtered and the filtrate was added dropwise to 2000 ml of 2-propanol. The precipitated polymer was filtered off with suction and washed twice in 1000 ml portions of cold demineralized water and once in 2000 ml of demineralized water at 80° C., filtered off, and dried for 72 hours at 50° C./10 mbar. The yield was 15.56 g. The polyhydroxyamide prepared in this manner was readily soluble in solvents such as NMP, γ-BL, tetrahydrofuran, cyclohexanone, cyclopentanone and diethylene glycol monomethyl ether.

Thermal, mechanical and adhesion properties (examples 10–30)

Example 10

Determination of the Thermal Stabilities

The polyhydroxyamides described have thermal stabilities of >450° C. according to TGA investigations (thermogravimetry, apparatus: STA 1500 from Rheometric Scientific, heating rate: 5 K/min, inert gas:argon). The isothermal mass loss per hour at 400° C. for 10 hours is:
Example 1: 0.4%
Example 2: 0.2%
Example 3: 0.3%
Example 4: 0.3%
Example 5: 0.2%
Example 6: 0.3%
Example 7: 0.2%
Example 8: 0.3%
Example 9: 0.3%

The polyhydroxyamides 1–9 described thus meet the requirements for the intended applications.

Example 11

Preparation of a Polymer Solution of Polyhydroxyamide 1 and Investigation of the Properties 5 g of the polyhydroxyamide 1 described in example 1 were dissolved in 20 g of NMP (VLSI-Selectipur®). The dissolution process was expediently effected on a shaking apparatus. The solution was then filtered under pressure through a 0.2 μm filter into a cleaned, particle-free sample tube.

a) Determination of the Adhesion of Polyhydroxyamide 1 to a Titanium Nitride Layer A 4" (10.16 cm) silicon wafer was provided with a 50 nm thick titanium nitride layer by sputtering. The abovementioned solution was applied to this wafer by spin coating, for 5 s at 500 rpm and for 25 s at 3500 rpm. After a short softbake of 1 mm at 120° C. on a hotplate, 10 silicon chips measuring 4×4 mm$^2$, which were likewise provided on the surface with 50 nm titanium nitride by sputtering, were pressed onto the polyhydroxyamide 1 film with a force of 2 N. This stack was then heated for 1 h at 300° C. in a nitrogen atmosphere in an oven. After cooling to room temperature, an adhesion test was carried out by means of a shear tester, Dage Series 400. The mean value of the force which was required for shearing off the Si chips was 2.1 kg/mm$^2$ (20.60 N/mm$^2$).

b) Determination of the Adhesion of Polyhydroxyamide 1 to a Tantalum Nitride Layer The experiment was carried out in exactly the same way as with titanium nitride (cf. example 5a), except that in this case the surface of the wafer and of the chips consisted not of titanium nitride but of tantalum nitride. The mean value of the force which was required for shearing off the Si chips was 1.9 kg/mm$^2$ (18.64 N/mm$^2$).

c) Determination of the Adhesion of Polyhydroxyamide 1 to a Silicon Wafer

The experiment was carried out in exactly the same way as with titanium nitride (cf. example 11a), except that in this case the surface of the wafer and of the chips consisted not of titanium nitride but of silicon. The mean value of the force which was required for shearing off the Si chips was 2.1 kg/mm2 (20.60 N/mm²).

d) Determination of the Adhesion of Polyhydroxyamide 1 after Thermal Loading Tests The same test specimens as in examples 11a–11c were produced again. After heating at 300° C., this stack was subjected 50 times to a thermal load in a conditioned cabinet, Vötsch VT7004, between −50° C. and 150° C. After this treatment, a shear test was carried out. Here, the forces were:
Example 11a: 1.9 kg/mm² (18.64 N/mm²)
Example 11b: 1.8 kg/mm² (17.66 N/mm²)
Example 11c: 2.0 kg/mm² (19.62 N/mm²)

Example 12

Preparation of a Polymer Solution of Polyhydroxyamide 2 and Investigation of the Properties 5 g of the polyhydroxyamide 2 described in example 2 were dissolved in 20 g of NMP (VLSI-Selectipur®). The dissolution process was expediently effected on a shaking apparatus. The solution was then filtered under pressure through a 0.2 μm filter into a cleaned, particle-free sample tube.

a) Determination of the Adhesion of Polyhydroxyamide 2 to a Titanium Nitride Layer A 4" (10.16 cm) silicon wafer was provided with a 50 nm thick titanium nitride layer by sputtering. The abovementioned solution was applied to this wafer by spin coating, for 5 s at 500 rpm and for 25 s at 3 500 rpm. After a short softbake of 1 mm at 120° C. on a hotplate, 10 silicon chips measuring 4×4 mm², which were likewise provided on the surface with 50 nm titanium nitride by sputtering, were pressed onto the polyhydroxyamide 2 film with a force of 2 N. This stack was then heated for 1 h at 300° C. in a nitrogen atmosphere in an oven. After cooling to room temperature, an adhesion test was carried out by means of a shear tester, Dage Series 400. The mean value of the force which was required for shearing off the Si chips was 2.2 kg/mm² (21.58 N/mm²).

b) Determination of the Adhesion of Polyhydroxyamide 2 to a Tantalum Nitride Layer The experiment was carried out in exactly the same way as with titanium nitride (cf. example 12a), except that in this case the surface of the wafer and of the chips consisted not of titanium nitride but of tantalum nitride. The mean value of the force which was required for shearing off the Si chips was 2.0 kg/mm² (19.62 N/mm²).

c) Determination of the Adhesion of Polyhydroxyamide 2 to a Silicon Wafer

The experiment was carried out in exactly the same way as with titanium nitride (cf. example 12a), except that in this case the surface of the wafer and of the chips consisted not of titanium nitride but of silicon. The mean value of the force which was required for shearing off the Si chips was 2.3 kg/mm² (22.56 N/mm²).

d) Determination of the Adhesion of Polyhydroxyamide 2 after Thermal Loading Tests The same test specimens as in examples 12a to 12c were produced again. After heating at 300° C., this stack was subjected 50 times to a thermal load in a conditioned cabinet, Vötsch VT7004, between −50° C. and 150° C. After this treatment, a shear test was carried out. Here, the forces were:
Example 12a: 2.1 kg/mm² (20.60 N/mm²)
Example 12b: 1.9 kg/mm² (18.64 N/mm²)
Example 12c: 2.0 kg/mm² (19.62 N/mm²)

Example 13

Preparation of a Polymer Solution of Polyhydroxyamide 3 and Investigation of the Properties 5 g of the polyhydroxyamide 3 described in example 3 were dissolved in 20 g of NMP (VLSI-Selectipur®). The dissolution process was expediently effected on a shaking apparatus. The solution was then filtered under pressure through a 0.2 μm filter into a cleaned, particle-free sample tube.

a) Determination of the Adhesion of Polyhydroxyamide 3 to a Titanium Nitride Layer A 4" (10.16 cm) silicon wafer was provided with a 50 nm thick titanium nitride layer by sputtering. The abovementioned solution was applied to this wafer by spin coating, for 5 s at 500 rpm and for 25 s at 3 500 rpm. After a short softbake of 1 mm at 120° C. on a hotplate, 10 silicon chips measuring 4×4mm², which were likewise provided on the surface with 50 nm titanium nitride by sputtering, were pressed onto the polyhydroxyamide 3 film with a force of 2 N. This stack was then heated for 1 h at 300° C. in a nitrogen atmosphere in an oven. After cooling to room temperature, an adhesion test was carried out by means of a shear tester, Dage Series 400. The mean value of the force which was required for shearing off the Si chips was 1.9 kg/mm² (18.64 N/mm²).

b) Determination of the Adhesion of Polyhydroxyamide 3 to a Tantalum Nitride Layer The experiment was carried out in exactly the same way as with titanium nitride (cf. example 13a), except that in this case the surface of the wafer and of the chips consisted not of titanium nitride but of tantalum nitride. The mean value of the force which was required for shearing off the Si chips was 1.8 kg/mm² (17.66 N/mm²).

c) Determination of the Adhesion of Polyhydroxyamide 3 to a Silicon Wafer

The experiment was carried out in exactly the same way as with titanium nitride (cf. example 13a), except that in this case the surface of the wafer and of the chips consisted not of titanium nitride but of silicon. The mean value of the force which was required for shearing off the Si chips was 2.0 kg/mm² (19.62 N/mm²).

d) Determination of the Adhesion of Polyhydroxyamide 3 after Thermal Loading Tests The same test specimens as in examples 13a to 13c were produced again. After heating at 300° C., this stack was subjected 50 times to a thermal load in a conditioned cabinet, Vötsch VT7004, between −50° C. and 150° C. After this treatment, a shear test was carried out. Here, the forces were:
Example 13a: 1.7 kg/mm² (16.67 N/mm²)
Example 13b: 1.7 kg/mm² (16.67 N/mm²)
Example 13c: 1.8 kg/mm² (17.66 N/mm²)

Example 14

Preparation of a Polymer Solution of Polyhydroxyamide 4 and Investigation of the Properties 5 g of the polyhydroxyamide 4 described in example 4 were dissolved in 20 g of NMP (VLSI-Selectipur®). The dissolution process was expediently effected on a shaking apparatus. The solution was then filtered under pressure through a 0.2 μm filter into a cleaned, particle-free sample tube.

a) Determination of the Adhesion of Polyhydroxyamide 4 to a Titanium Nitride Layer A 4" (10.16 cm) silicon wafer was provided with a 50 nm thick titanium nitride layer by sputtering. The abovementioned solution was applied to this wafer by spin coating, for 5 s at 500 rpm and for 25 s at 3500 rpm. After a short softbake of 1 mm at 120° C. on a hotplate, 10 silicon chips measuring 4×4 mm$^2$, which were likewise provided on the surface with 50 nm titanium nitride by sputtering, were pressed onto the polyhydroxyamide 4 film with a force of 2 N. This stack was then heated for 1 h at 300° C. in a nitrogen atmosphere in an oven. After cooling to room temperature, an adhesion test was carried out by means of a shear tester, Dage Series 400. The mean value of the force which was required for shearing off the Si chips was 2.0 kg/mm$^2$ (19.62 N/mm$^2$).

b) Determination of the Adhesion of Polyhydroxyamide 4 to a Tantalum Nitride Layer The experiment was carried out in exactly the same way as with titanium nitride (cf. example 14a), except that in this case the surface of the wafer and of the chips consisted not of titanium nitride but of tantalum nitride. The mean value of the force which was required for shearing off the Si chips was 1.9 kg/mm$^2$ (18.64 N/mm$^2$).

c) Determination of the Adhesion of Polyhydroxyamide 4 to a Silicon Wafer

The experiment was carried out in exactly the same way as with titanium nitride (cf. example 14a), except that in this case the surface of the wafer and of the chips consisted not of titanium nitride but of silicon. The mean value of the force which was required for shearing off the Si chips was 2.1 kg/mm$^2$ (20.60 N/mm$^2$).

d) Determination of the Adhesion of Polyhydroxyamide 4 after Thermal Loading Tests The same test specimens as in examples 14a to 14c were produced again. After heating at 300° C., this stack was subjected 50 times to a thermal load in a conditioned cabinet, Vötsch VT7004, between −50° C. and 150° C. After this treatment, a shear test was carried out. Here, the forces were:
Example 14a: 1.8 kg/mm$^2$ (17.66 N/mm$^2$)
Example 14b: 1.75 kg/mm$^2$ (17.17 N/mm$^2$)
Example 14c: 2.0 kg/mm$^2$ (19.62 N/mm$^2$)

Example 15

Preparation of a Polymer Solution of Polyhydroxyamide 5 and Investigation of the Properties 5 g of the polyhydroxyamide 5 described in example 5 were dissolved in 20 g of NMP (VLSI-Selectipur®). The dissolution process was expediently effected on a shaking apparatus. The solution was then filtered under pressure through a 0.2 μm filter into a cleaned, particle-free sample tube.

a) Determination of the Adhesion of Polyhydroxyamide 5 to a Titanium Nitride Layer A 4" (10.16 cm) silicon wafer was provided with a 50 nm thick titanium nitride layer by sputtering. The abovementioned solution was applied to this wafer by spin coating, for 5 s at 500 rpm and for 25 s at 3500 rpm. After a short softbake of 1 min at 120° C. on a hotplate, 10 silicon chips measuring 4×4 mm$^2$, which were likewise provided on the surface with 50 nm titanium nitride by sputtering, were pressed onto the polyhydroxyamide 5 film with a force of 2 N. This stack was then heated for 1 h at 300° C. in a nitrogen atmosphere in an oven. After cooling to room temperature, an adhesion test was carried out by means of a shear tester, Dage Series 400. The mean value of the force which was required for shearing off the Si chips was 2.2 kg/mm$^2$ (21.58 N/mm$^2$).

b) Determination of the Adhesion of Polyhydroxyamide 5 to a Tantalum Nitride Layer The experiment was carried out in exactly the same way as with titanium nitride (cf. example 15a), except that in this case the surface of the wafer and of the chips consisted not of titanium nitride but of tantalum nitride. The mean value of the force which was required for shearing off the Si chips was 2.0 kg/mm$^2$ (19.62 N/mm$^2$).

c) Determination of the Adhesion of Polyhydroxyamide 5 to a Silicon Wafer

The experiment was carried out in exactly the same way as with titanium nitride (cf. example 15a), except that in this case the surface of the wafer and of the chips consisted not of titanium nitride but of silicon. The mean value of the force which was required for shearing off the Si chips was 2.3 kg/mm$^2$ (22.56 N/mm$^2$).

d) Determination of the Adhesion of Polyhydroxyamide 5 after Thermal Loading Tests The same test specimens as in examples 15a to 15c were produced again. After heating at 300° C., this stack was subjected 50 times to a thermal load in a conditioned cabinet, Vötsch VT7004, between −50° C. and 150° C. After this treatment, a shear test was carried out. Here, the forces were:
Example 15a: 2.1 kg/mm$^2$ (20.60 N/mm$^2$)
Example 15b: 1.9 kg/mm$^2$ (18.64 N/mm$^2$)
Example 15c: 2.0 kg/mm$^2$ (19.62 N/mm$^2$)

Example 16

Preparation of a Polymer Solution of Polyhydroxyamide 6 and Investigation of the Properties 15 g of the polyhydroxyamide 6 described in example 6 were dissolved in 20 g of NMP (VLSI-Selectipur®). The dissolution process was expediently effected on a shaking apparatus. The solution was then filtered under pressure through a 0.2 μm filter into a cleaned, particle-free sample tube.

a) Determination of the Adhesion of Polyhydroxyamide 6 to a Titanium Nitride Layer A 4" (10.16 cm) silicon wafer was provided with a 50 nm thick titanium nitride layer by sputtering. The abovementioned solution was applied to this wafer by spin coating, for 5 s at 500 rpm and for 25 s at 3500 rpm. After a short softbake of 1 min at 120° C. on a hotplate, 10 silicon chips measuring 4×4 mm², which were likewise provided on the surface with 50 nm titanium nitride by sputtering, were pressed onto the polyhydroxyamide 6 film with a force of 2 N. This stack was then heated for 1 h at 300° C. in a nitrogen atmosphere in an oven. After cooling to room temperature, an adhesion test was carried out by means of a shear tester, Dage Series 400. The mean value of the force which was required for shearing off the Si chips was 1.9 kg/mm² (18.64 N/mm²).

b) Determination of the Adhesion of Polyhydroxyamide 6 to a Tantalum Nitride Layer The experiment was carried out in exactly the same way as with titanium nitride (cf. example 16a), except that in this case the surface of the wafer and of the chips consisted not of titanium nitride but of tantalum nitride. The mean value of the force which was required for shearing off the Si chips was 1.9 kg/mm² (18.64 N/mm²).

c) Determination of the Adhesion of Polyhydroxyamide 6 to a Silicon Wafer

The experiment was carried out in exactly the same way as with titanium nitride (cf. example 16a), except that in this case the surface of the wafer and of the chips consisted not of titanium nitride but of silicon. The mean value of the force which was required for shearing off the Si chips was 1.8 kg/mm² (17.66 N/mm²).

d) Determination of the Adhesion of Polyhydroxyamide 6 after Thermal Loading Tests The same test specimens as in examples 16a to 16c were produced again. After heating at 300° C., this stack was subjected 50 times to a thermal load in a conditioned cabinet, Vötsch VT7004, between −50° C. and 150° C. After this treatment, a shear test was carried out. Here, the forces were:
Example 16a: 1.8 kg/mm² (17.66 N/mm²)
Example 16b: 1.7 kg/mm² (16.67 N/mm²)
Example 16c: 1.6 kg/mm² (15.69 N/mm²)

Example 17

Preparation of a Polymer Solution of Polyhydroxyamide 7 and Investigation of the Properties 5 g of the polyhydroxyamide 7 described in example 7 were dissolved in 20 g of NMP (VLSI-Selectipur®). The dissolution process was expediently effected on a shaking apparatus. The solution was then filtered under pressure through a 0.2 μm filter into a cleaned, particle-free sample tube.

a) Determination of the Adhesion of Polyhydroxyamide 7 to a Titanium Nitride Layer A 4" (10.16 cm) silicon wafer was provided with a 50 nm thick titanium nitride layer by sputtering. The abovementioned solution was applied to this wafer by spin coating, for 5 s at 500 rpm and for 25 s at 3500 rpm. After a short softbake of 1 min at 120° C. on a hotplate, 10 silicon chips measuring 4×4 mm², which were likewise provided on the surface with 50 nm titanium nitride by sputtering, were pressed onto the polyhydroxyamide 4 film with a force of 2 N. This stack was then heated for 1 h at 300° C. in a nitrogen atmosphere in an oven. After cooling to room temperature, an adhesion test was carried out by means of a shear tester, Dage Series 400. The mean value of the force which was required for shearing off the Si chips was 2.2 kg/mm² (21.58 N/mm²).

b) Determination of the Adhesion of Polyhydroxyamide 7 to a Tantalum Nitride Layer The experiment was carried out in exactly the same way as with titanium nitride (cf. example 17a), except that in this case the surface of the wafer and of the chips consisted not of titanium nitride but of tantalum nitride. The mean value of the force which was required for shearing off the Si chips was 2.2 kg/mm² (21.58 N/mm²).

c) Determination of the Adhesion of Polyhydroxyamide 7 to a Silicon Wafer

The experiment was carried out in exactly the same way as with titanium nitride (cf. example 17a), except that in this case the surface of the wafer and of the chips consisted not of titanium nitride but of silicon. The mean value of the force which was required for shearing off the Si chips was 2.1 kg/mm² (20.60 N/mm²).

d) Determination of the Adhesion of Polyhydroxyamide 7 after Thermal Loading Tests The same test specimens as in examples 17a to 17c were produced again. After heating at 300° C., this stack was subjected 50 times to a thermal load in a conditioned cabinet, Vötsch VT7004, between −50° C. and 150° C. After this treatment, a shear test was carried out. Here, the forces were:
Example 17a: 2.1 kg/mm² (20.60 N/mm²)
Example 17b: 2.15 kg/mm² (21.09 N/mm²)
Example 17c: 2.0 kg/mm² (19.62 N/mm²)

Example 18

Preparation of a Polymer Solution of Polyhydroxyamide 8 and Investigation of the Properties 5 g of the polyhydroxyamide 8 described in example 8 were dissolved in 20 g of NMP (VLSI-Selectipur®). The dissolution process was expediently effected on a shaking apparatus. The solution was then filtered under pressure through a 0.2 μm filter into a cleaned, particle-free sample tube.

a) Determination of the Adhesion of Polyhydroxyamide 8 to a Titanium Nitride Layer A 4" (10.16 cm) silicon wafer was provided with a 50 nm thick titanium nitride layer by sputtering. The abovementioned solution was applied to this wafer by spin coating, for 5 s at 500 rpm and for 25 s at 3500 rpm. After a short softbake of 1 min at 120° C. on a hotplate, 10 silicon chips measuring 4×4 mm², which were likewise provided on the surface with 50 nm titanium nitride by sputtering, were pressed onto the polyhydroxyamide 5 film with a force of 2 N. This stack was then heated for 1 h at 300° C. in a nitrogen atmosphere in an oven. After cooling to room temperature, an adhesion test was carried out by means of a shear tester, Dage Series 400. The mean value of the force which was required for shearing off the Si chips was 2.2 kg/mm² (21.58 N/mm²).

b) Determination of the Adhesion of Polyhydroxyamide 8 to a Tantalum Nitride Layer The experiment was carried out in exactly the same way as with titanium nitride (cf. example 18a), except that in this case the surface of the wafer and of the chips consisted not of titanium nitride but of tantalum nitride. The mean value of the force which was required for shearing off the Si chips was 1.9 kg/mm² (18.64 N/mm²).

c) Determination of the Adhesion of Polyhydroxyamide 8 to a Silicon Wafer

The experiment was carried out in exactly the same way as with titanium nitride (cf. example 18a), except that in this case the surface of the wafer and of the chips consisted not of titanium nitride but of silicon. The mean value of the force which was required for shearing off the Si chips was 2.3 kg/mm² (22.56 N/mm²).

d) Determination of the Adhesion of Polyhydroxyamide 8 after Thermal Loading Tests The same test specimens as in examples 18a to 18c were produced again. After heating at 300° C., this stack was subjected 50 times to a thermal load in a conditioned cabinet, Vötsch VT7004, between −50° C. and 150° C. After this treatment, a shear test was carried out. Here, the forces were:
Example 18a: 2.1 kg/mm² (20.60 N/mm²)
Example 18b: 1.8 kg/mm² (17.66 N/mm²)
Example 18c: 2.0 kg/mm² (19.62 N/mm²)

Example 19

Preparation of a Polymer Solution of Polyhydroxyamide 9 and Investigation of the Properties 5 g of the polyhydroxyamide 9 described in example 9 were dissolved in 20 g of NMP (VLSI-Selectipur®). The dissolution process was expediently effected on a shaking apparatus. The solution was then filtered under pressure through a 0.2 μm filter into a cleaned, particle-free sample tube.

a) Determination of the Adhesion of Polyhydroxyamide 9 to a Titanium Nitride Layer A 4" (10.16 cm) silicon wafer was provided with a 50 nm thick titanium nitride layer by sputtering. The abovementioned solution was applied to this wafer by spin coating, for 5 s at 500 rpm and for 25 s at 3500 rpm. After a short softbake of 1 min at 120° C. on a hotplate, 10 silicon chips measuring 4×4 mm², which were likewise provided on the surface with 50 nm titanium nitride by sputtering, were pressed onto the polyhydroxyamide 6 film with a force of 2 N. This stack was then heated for 1 h at 300° C. in a nitrogen atmosphere in an oven. After cooling to room temperature, an adhesion test was carried out by means of a shear tester, Dage Series 400. The mean value of the force which was required for shearing off the Si chips was 1.9 kg/mm² (18.64 N/mm²).

b) Determination of the Adhesion of Polyhydroxyamide 9 to a Tantalum Nitride Layer The experiment was carried out in exactly the same way as with titanium nitride (cf. example 19a), except that in this case the surface of the wafer and of the chips consisted not of titanium nitride but of tantalum nitride. The mean value of the force which was required for shearing off the Si chips was 1.9 kg/mm² (18.64 N/mm²).

c) Determination of the Adhesion of Polyhydroxyamide 9 to a Silicon Wafer

The experiment was carried out in exactly the same way as with titanium nitride (cf. example 19a), except that in this case the surface of the wafer and of the chips consisted not of titanium nitride but of silicon. The mean value of the force which was required for shearing off the Si chips was 1.8 kg/mm² (17.66 N/mm²).

d) Determination of the Adhesion of Polyhydroxyamide 9 after Thermal Loading Tests The same test specimens as in examples 19a to 19c were produced again. After heating at 300° C., this stack was subjected 50 times to a thermal load in a conditioned cabinet, Vötsch VT7004, between −50° C. and 150° C. After this treatment, a shear test was carried out. Here, the forces were:
Example 19a: 1.8 kg/mm² (17.66 N/mm²)
Example 19b: 1.7 kg/mm² (16.67 N/mm²)
Example 19c: 1.7 kg/mm² (16.67 N/mm²)

Example 20

Comparative Example for Adhesion

A polyhydroxyamide prepared analogously to example 1 of U.S. Pat. No. 5,077,378 and in the same solution in NMP as in example 11 and the same experiments as in 11a to 11c gave the following mean values:

| | |
|---|---|
| Titanium surface: | 1.5 kg/mm² (14.71 N/mm²) |
| Tantalum nitride surface: | 1.6 kg/mm² (15.69 N/mm²) |
| Silicon surface: | 1.55 kg/mm² (15.21 N/mm²) |

Example 21

Determination of the Resilience of Polyhydroxyamide 1

For the polyhydroxyamide 1 described under example 1, substantially higher resiliences were determined compared with the material in example 1 of U.S. Pat. No. 5,077,378. Tensile tests were carried out using the apparatus MTS 858 from MTS System Corp. on films. The elongation was 82%. After the load was removed, the material contracted completely.

Example 22

Determination of the Resilience of Polyhydroxyamide 2

Tensile tests were carried out using the apparatus MTS 858 from MTS System Corp. on films. The elongation was 62%. After the load was removed, the material contracted completely.

Example 23

Determination of the Resilience of Polyhydroxyamide 3

Tensile tests were carried out using the apparatus MTS 858 from MTS System Corp. on films. The elongation was 78%. After the load was removed, the material contracted completely.

Example 24

Determination of the Resilience of Polyhydroxyamide 4

Tensile tests were carried out using the apparatus MTS 858 from MTS System Corp. on films. The elongation was 80%. After the load was removed, the material contracted completely.

Example 25

Determination of the Resilience of Polyhydroxyamide 5

Tensile tests were carried out using the apparatus MTS 858 from MTS System Corp. on films. The elongation was 62%. After the load was removed, the material contracted completely.

Example 26

Determination of the Resilience of Polyhydroxyamide 6

Tensile tests were carried out using the apparatus MTS 858 from MTS System Corp. on films. The elongation was 76%. After the load was removed, the material contracted completely.

Example 27

Determination of the Resilience of Polyhydroxyamide 7

Tensile tests were carried out using the apparatus MTS 858 from MTS System Corp. on films. The elongation was 83%. After the load was removed, the material contracted completely.

Example 28

Determination of the Resilience of Polyhydroxyamide 8

Tensile tests were carried out using the apparatus MTS 858 from MTS System Corp. on films. The elongation was 75%. After the load was removed, the material contracted completely.

Example 29

Determination of the Resilience of Polyhydroxyamide 9

Tensile tests were carried out using the apparatus MTS 858 from MTS System Corp. on films. The elongation was 70%. After the load was removed, the material contracted completely.

Example 30

Comparative Example for Resilience

A polyhydroxyamide prepared analogously to example 1 of U.S. Pat. No. 5,077,378 was subjected to a tensile test using the apparatus MTS 858 from MTS System Corp. on films. The elongation was 9%.

Further Synthesis Examples

Example 31

Polyhydroxyamide 10

7.78 g (21.25 mmol) of bisaminophenol 2 were dissolved in 130 ml of distilled N-methylpyrrolidone (NMP). A solution of 4.62 g (15.66 mmol) of dicarboxylic acid chloride 2 and 2.03 g (6.71 mmol) of dicarboxylic acid chloride 5 (70:30) in 50 ml of distilled γ-butyrolactone (γ-BL) was added dropwise to this solution at 10° C. while stirring. Stirring was effected for a further hour at 10° C. and then for 1 hour at 20° C. A solution of 5.75 g (5.75 mmol) of bishydroxycarbonate 1 in 60 ml of distilled NMP was then added dropwise at 10° C. The reaction solution was stirred for a further 1.5 hours at 10° C. and then for 12 hours at 20° C. After cooling again to 10° C., 5.65 g (55.93 mmol) of triethylamine, dissolved in 20 ml of NMP, were added to the reaction mixture, which was warmed up to room temperature and stirred for 2 hours. In order to isolate the polymer, the reaction mixture was filtered and the filtrate was added dropwise to 2000 ml of 2-propanol. The precipitated polymer was filtered off with suction and washed twice in 1000 ml portions of cold demineralized water and once in 2000 ml of demineralized water at 80° C., filtered off, and dried for 72 hours at 50° C./10 mbar. The yield was 14.86 g. The polyhydroxyamide prepared in this manner was readily soluble in solvents such as NMP, γ-BL, tetrahydrofuran, cyclohexanone, cyclopentanone and diethylene glycol monomethyl ether.

Example 32

Polyhydroxyamide 11

7.78 g (17 mmol) of bisaminophenol 1 and 1.55 g (4.24 mmol) of bisaminophenol 2 were dissolved in 140 ml of distilled N-methylpyrrolidone (NMP). A solution of 5.08 g (22.37 mmol) of dicarboxylic acid chloride 1 in 70 ml of distilled γ-butyrolactone (γ-BL) was added dropwise to this solution at 10° C. while stirring. Stirring was effected for a further hour at 10° C. and then for 1 hour at 20° C. A solution of 11.50 g (5.75 mmol) of bishydroxycarbonate 2 in 60 ml of distilled NMP was then added dropwise at 10° C. The reaction solution was stirred for a further 1.5 hours at 10° C. and then for 12 hours at 20° C. After cooling again to 10° C. 5.65 g (55.93 mmol) of triethylamine, dissolved in 20 ml of NMP, were added to the reaction mixture, which was warmed up to room temperature and stirred for 2 hours. In order to isolate the polymer, the reaction mixture was filtered and the filtrate was added dropwise to 2000 ml of 2-propanol. The precipitated polymer was filtered off with suction and washed twice in 1000 ml portions of cold demineralized water and once in 2000 ml of demineralized water at 80° C., filtered off, and dried for 72 hours at 50° C./10 mbar. The yield was 16.19 g. The polyhydroxyamide prepared in this manner was readily soluble in solvents such as NMP, γ-BL, tetrahydrofuran, cyclohexanone, cyclopentanone and diethylene glycol monomethyl ether.

Example 33

Polyhydroxyamide 12

172.14 g (0.47 mol) of bisaminophenol 2 were dissolved in 600 ml of distilled NMP. A solution of 97.45 g (0.48 mol) of dicarboxylic acid chloride 3 in 550 ml of distilled γ-BL was added dropwise to this solution at 10° C. while stirring. Stirring was effected for a further hour at 10° C. and then for 1 hour at 20° C. A solution of 240 g (0.12 mol) of bishydroxycarbonate 2 in 500 ml of distilled γ-BL was then added dropwise at 10° C. The reaction solution was stirred for a further 1.5 hours at 10° C. and then for 12 hours at 20° C. A solution of 19.7 g (0.12 mol) of endcap 1 in 150 ml of distilled γ-BL was then added dropwise at 10° C. The reaction solution was stirred for a further 1.5 hours at 10° C. and then for 12 hours at 20° C. After cooling again to 10° C., 129.4 g (1.6 mol) of pyridine, dissolved in 450 ml of γ-BL, were added to the reaction mixture, which was warmed up to room temperature and stirred for 2 hours.

In order to isolate the polymer, the reaction mixture was filtered and the filtrate was added dropwise to a mixture of 3500 ml of demineralized water and 1500 ml of 2-propanol. The precipitated polymer was filtered off with suction and washed twice in 2000 ml portions of cold demineralized water and once in 1000 ml of demineralized water at 80° C., filtered off, and dried for 72 hours at 50° C./10 mbar. The yield was 459.3 g.

The polyhydroxyamide prepared in this manner was readily soluble in solvents such as NMP, γ-BL, tetrahydrofuran, cyclohexanone, cyclopentanone and diethylene glycol monomethyl ether. It has terminal groups introduced by endcap 1. The product can be completely cyclized to give the corresponding polybenzoxazole.

Example 34

Polyhydroxyamide 13

135.51 g (0.24 mol) of bisaminophenol 1 and 51.89 g (0.24 mol) of bisaminophenol 3 were dissolved in 600 ml of distilled NMP. A solution of 56.76 g (0.25 mol) of dicarboxylic acid chloride 1 and 50.75 g (0.25 mol) of dicarboxylic acid chloride 3 in 550 ml of distilled γ-BL was added dropwise to this solution at 10° C. while stirring. Stirring was effected for a further hour at 10° C. and then for 1 hour at 20° C. A solution of 120 g (0.12 mol) of bishydroxycarbonate 1 in 400 ml of distilled γ-BL was then added dropwise at 10° C. The reaction solution was stirred for a further 1.5 hours at 10° C. and then for 12 hours at 20° C. A solution of 12.54 g (0.12 mol) of endcap 2 in 120 ml of distilled γ-BL was then added dropwise at 10° C. The reaction solution was stirred for a further 1.5 hours at 10° C. and then for 12 hours at 20° C. After cooling again to 10° C., 129.4 g (1.6 mol) of pyridine, dissolved in 450 ml of γ-BL, are added to the reaction mixture, which was warmed up to room temperature and stirred for 2 hours.

In order to isolate the polymer, the reaction mixture was filtered and the filtrate was added dropwise to a mixture of 3000 ml of demineralized water and 1000 ml of 2-propanol. The precipitated polymer was filtered off with suction and washed twice in 2000 ml portions of cold demineralized water and once in 1000 ml of demineralized water at 80° C., filtered off, and dried for 72 hours at 50° C./10 mbar. The yield was 393.7 g.

The polyhydroxyamide prepared in this manner was readily soluble in solvents such as NMP, γ-BL, tetrahydrofuran, cyclohexanone, cyclopentanone and diethylene glycol monomethyl ether.

Example 35

Polyhydroxyamide 14

172.14 g (0.47 mol) of bisaminophenol 2 were dissolved in 600 ml of distilled NMP. A solution of 97.45 g (0.48 mol) of dicarboxylic acid chloride 3 in 550 ml of distilled γ-BL was added dropwise to this solution at 10° C. while stirring. Stirring was effected for a further hour at 10° C. and then for 1 hour at 20° C. A solution of 300 g (0.12 mol) of polyether 1 in 500 ml of distilled γ-BL was then added dropwise at 10° C. The reaction solution was stirred for a further 1.5 hours at 10° C. and then for 12 hours at 20° C. A solution of 19.7 g (0.12 mol) of endcap 1 in 150 ml of distilled γ-BL was then added dropwise at 10° C. The reaction solution was stirred for a further 1.5 hours at 10° C. and then for 12 hours at 20° C. After cooling again to 10° C., 129.4 g (1.6 mol) of pyridine, dissolved in 450 ml of γ-BL, were added to the reaction mixture, which was warmed up to room temperature and stirred for 2 hours.

In order to isolate the polymer, the reaction mixture was filtered and the filtrate was added dropwise to a mixture of 3500 ml of demineralized water and 1500 ml of 2-propanol. The precipitated polymer was filtered off with suction and washed twice in 2000 ml portions of cold demineralized water and once in 1000 ml of demineralized water at 80° C., filtered off, and dried for 72 hours at 50° C./10 mbar. The yield was 463.5 g.

The polyhydroxyamide prepared in this manner was readily soluble in solvents such as NMP, γ-BL, tetrahydrofuran, cyclohexanone, cyclopentanone and diethylene glycol monomethyl ether. Thermal load capacity and resilience and adhesion on various substrates were outstanding.

Thermal load capacity, resilience and adhesion on various substrates were also outstanding for the polyhydroxyamides 10 to 13.

The invention claimed is:

1. A polyhydroxyamide of the following formula I or formula II:

Formula I:

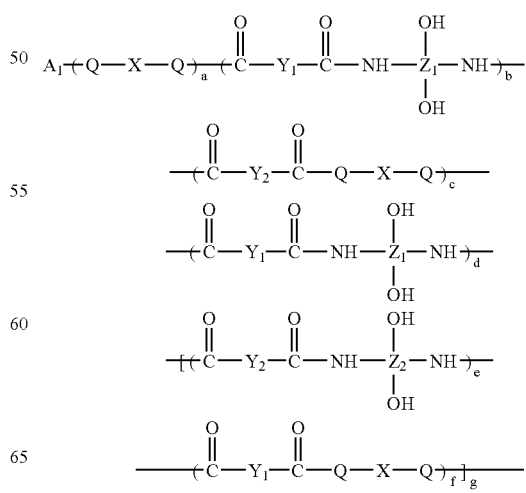

-continued

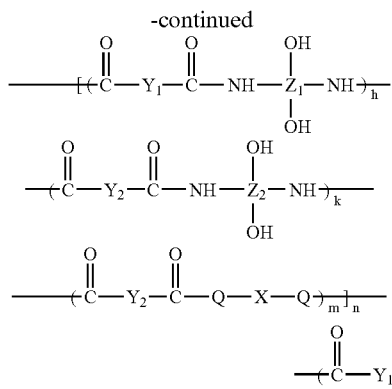

wherein:
a=0 or 1, wherein, if a is 0, c is ≧1,
b=0–100,
c=0–50, wherein, if c is 0, a is 1,
d=1–100,
e=0–100,
f=0–100,
g=0–50,
h=0–100,
k=0–100,
m=0–100,
n=0–50,
p=0 or 1;

Formula II:

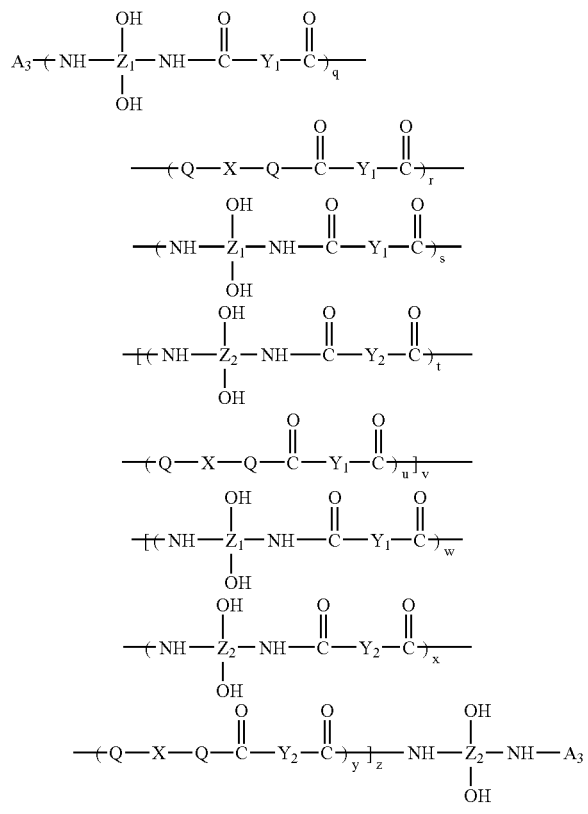

wherein:
q=1–100,
r=1–100,
s=0–100,
t=0–100,
u=0–100,
v=0–50,
w=0–100,
x=0–100,
y=0–100,
z=0–50;

each X is independently:

$X_1$:

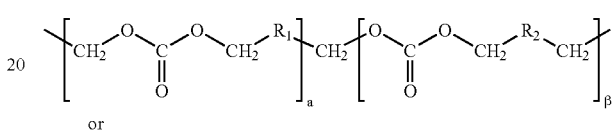

or $X_2$:

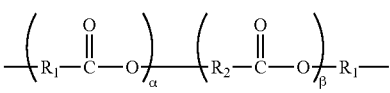

or $X_3$:

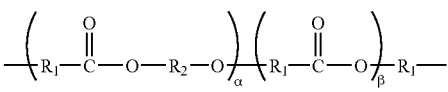

or $X_4$:

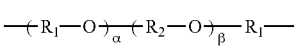

or $X_5$:

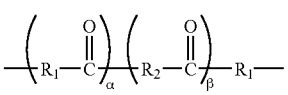

or $X_6$:

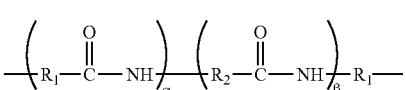

and α=0–100 and β=0–100, wherein α and β are not simultaneously 0;

each $R_1$ and $R_2$ is independently:
alkylene, arylene or cycloalkylene each of which is independently substituted or unsubstituted;

each Q is independently —O—, —S— or —NH—;

when at least one of $A_1$ or $A_2$ is bonded to Q or —NH—, each of $A_1$ and $A_2$ is independently:
H; alkylcarbonyl, alkenylcarbonyl, cycloalkenylcarbonyl, arylcarbonyl, aralkylcarbonyl, aralkenylcarbonyl or aralkynylcarbonyl, each of which is independently substituted or unsubstituted, wherein the carbonyl group is bonded to the aromatic, alkyl, alkenyl, cycloalkenyl or alkynyl group;

when at least one of $A_1$ or $A_2$ is bonded to —CO—, each of $A_1$ and $A_2$ is independently:
  hydroxyl, alkoxy, alkenyloxy, aryloxy, cycloalkenyloxy, amino, alkylamino, alkenylamino, arylamino, arylalkenyloxy, or arylalkylamino, each of which is independently substituted or unsubstituted;
$A_3$ is:
  H, alkylcarbonyl, alkenylcarbonyl, cycloalkenylcarbonyl, arylcarbonyl, aralkylcarbonyl, aralkenylcarbonyl or aralkynylcarbonyl, each of which is independently substituted or unsubstituted, wherein the carbonyl group is bonded to the aromatic or to the alkyl, alkenyl, cycloalkenyl or alkynyl group;
each of $Y_1$ and $Y_2$ is independently:
  substituted or unsubstituted aryl, a substituted or unsubstituted polynuclear aromatic hydrocarbon compound, or alkyl, alkenyl, alkynyl, aralkyl, aralkenyl, or aralkynyl, each of which is substituted or unsubstituted;
each of $Z_1$ and $Z_2$ is independently:
  aryl, aralkyl, aralkenyl, aralkynyl, heteroaryl or a polynuclear aromatic hydrocarbon compound.

2. The polyhydroxyamide as claimed in claim 1, wherein, in formula I, b=0–20, c=0–10, d=4–40, e=0–20, f=0–20, g=0–10, h=0–20, k=0–20, m=0–20 or n=0–10;
and, in formula II, q=3–40, r=1–40, s=0–40, t=0–20, u=0–20, v=0–10, w=0–20, x=0–20, y=0–20 or z=0–10.

3. The polyhydroxyamide of claim 1 wherein $\alpha$=0–10 or $\beta$=0–10.

4. The polyhydroxyamide of claim 1, wherein at least one of $R_1$ or $R_2$ is:

—(CH$_2$)$_\chi$—

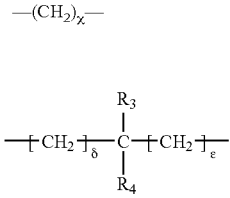

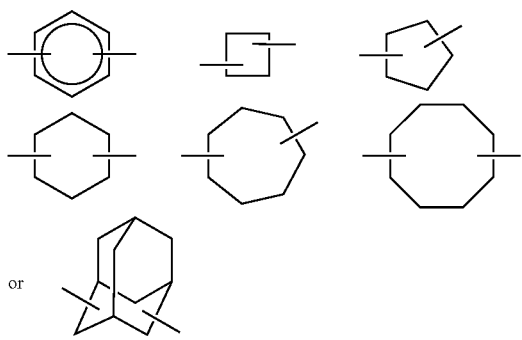

where
  $\chi$=1–20
  $\delta$=0–20,
  $\epsilon$=0–20, and
  each $R_3$ and $R_4$ is independently: —H, or —(CH$_2$)$_\phi$—CH$_3$, wherein $\phi$=0–10 or —OH, and $R_3$ and $R_4$ are not simultaneously —OH.

5. The polyhydroxyamide of claim 1, wherein each Q is independently —O— or —NH—.

6. The polyhydroxyamide of claim 1, $A_1$ or $A_2$, if $A_1$ or $A_2$ is bonded to Q or —NH—, and $A_3$ are:

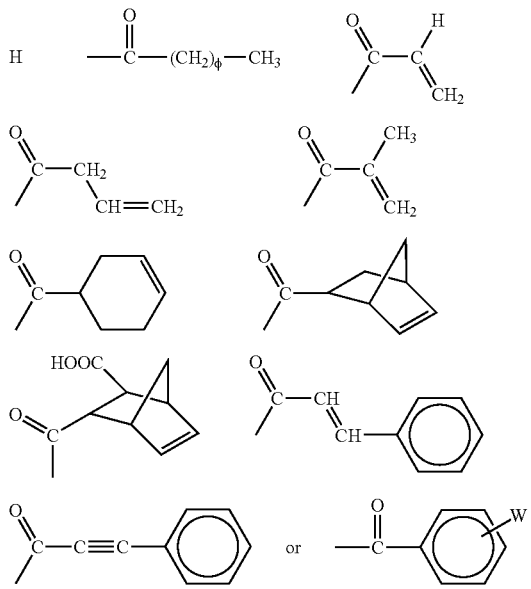

wherein
  $\phi$=0–10; and
  W=—CN, —C(CH$_3$)$_3$, —(CH$_2$)$_\phi$—CH$_3$, —(CF$_2$)$_\phi$—CF$_3$, —O—(CH$_2$)$_\phi$—CH$_3$, —O—(CF$_2$)$_\phi$—CF$_3$,
  —CH=CH$_2$, —C≡CH or

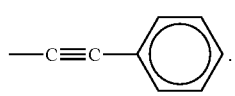

7. The polyhydroxyamide of claim 1, wherein if at least one of $A_1$ or $A_2$ is bonded to —CO—, then at least one of $A_1$ or $A_2$ is:

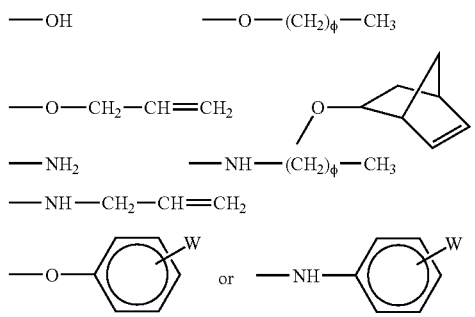

wherein
  $\phi$=0–10;
  and W=—CN, —C(CH$_3$)$_3$, —(CH$_2$)$_\phi$—CH$_3$, —(CF$_2$)$_\phi$—CF$_3$, —O—(CH$_2$)$_\phi$—CH$_3$, —O—(CF$_2$)$_\phi$—CF$_3$,
  —CH=CH$_2$, —C≡CH or

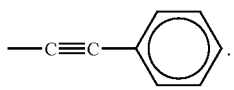

8. The polyhydroxyamide of claim 1, wherein each $Y_1$ and $Y_2$ are independently:

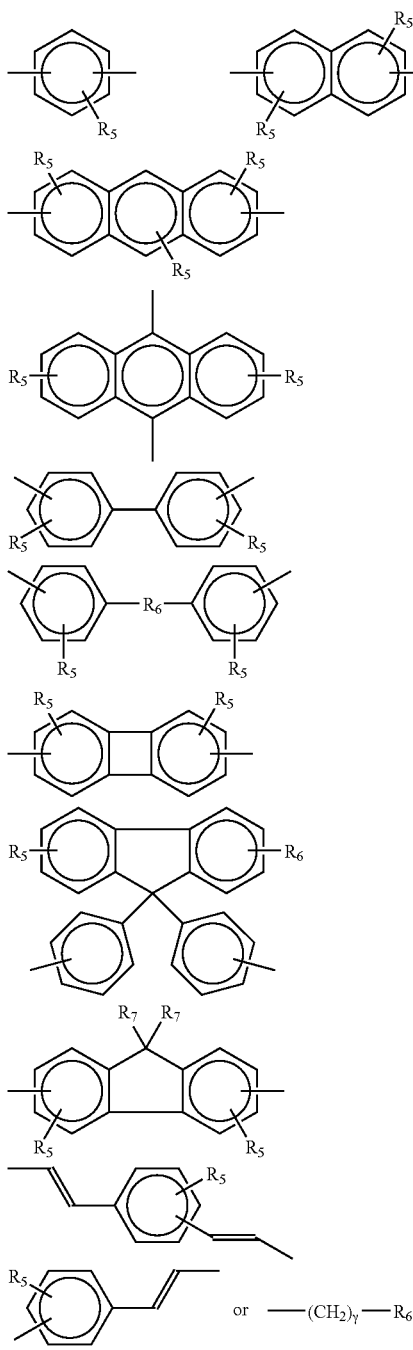

wherein each R5, R6 and R7 is independently a substituent; and wherein; if $R_6$=—$CH_2$—, then $\gamma$=0–10.

9. The polyhydroxyamide of claim 8, wherein each $R_5$ is independently —H, —CN, —C(CH$_3$)$_3$, —(CH$_2$)$_\phi$—CH$_3$, —(CF$_2$)$_\phi$—CF$_3$, —O—(CH$_2$)$_\phi$CH$_3$, —O—(CF$_2$)$_\phi$—CF$_3$

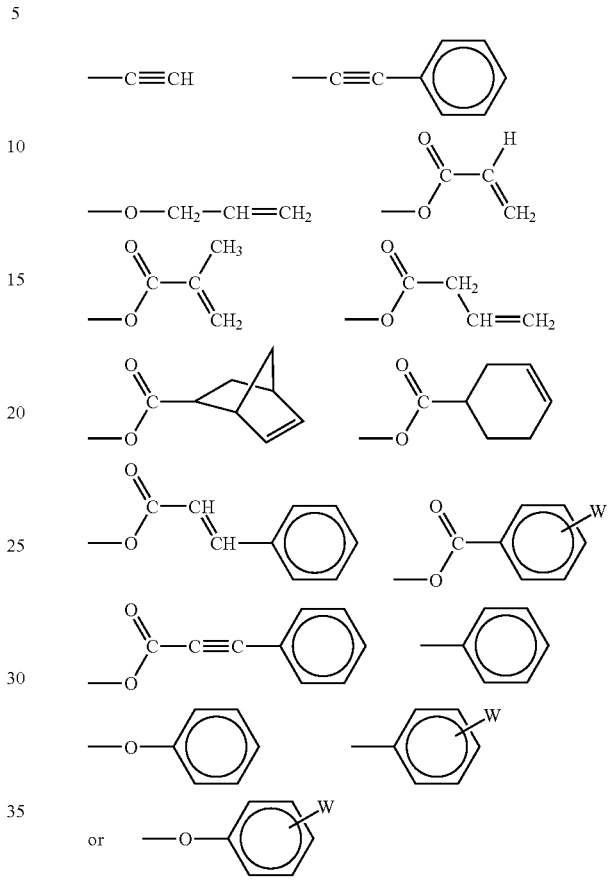

wherein $\phi$=0–10 and W=—CN—, —C(CH$_3$)$_3$, —(CH$_2$)$_\phi$—CH$_3$, —(CF$_2$)$_\phi$—CF$_3$, —O—(CH$_2$)$_\phi$—CH$_3$, —O—(CF$_2$)$_\phi$—CF$_3$, —CH=CH$_2$, —C≡CH or

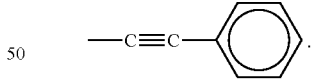

10. The polyhydroxyamide of claim 8, wherein each $R_6$ is independently —O—, —CO—, —NR$_7$—, —S—, —SO$_2$—, —S$_2$—, —CH$_2$—, and wherein $R_8$ is a substituent

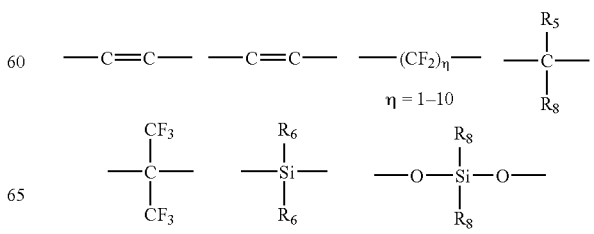

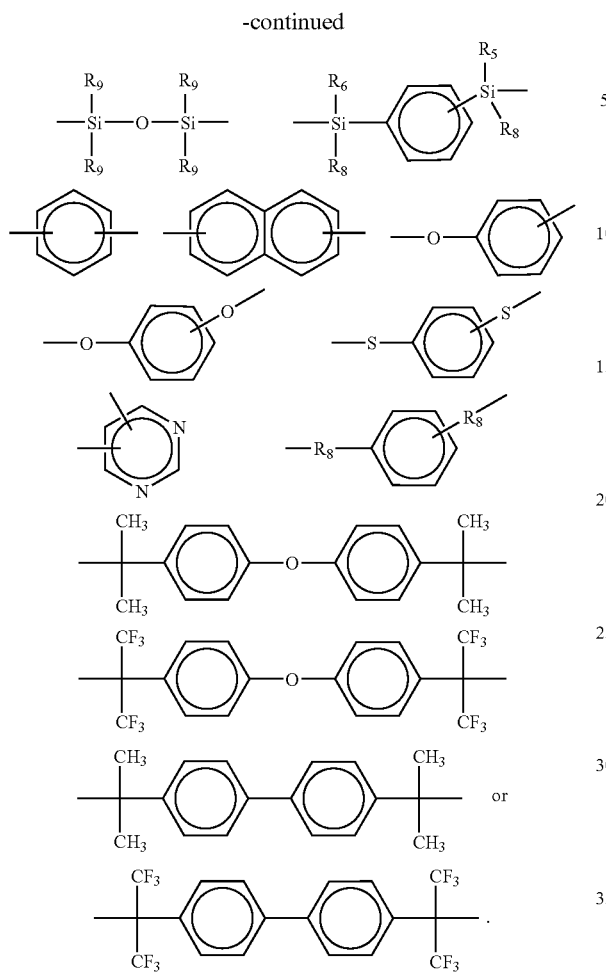

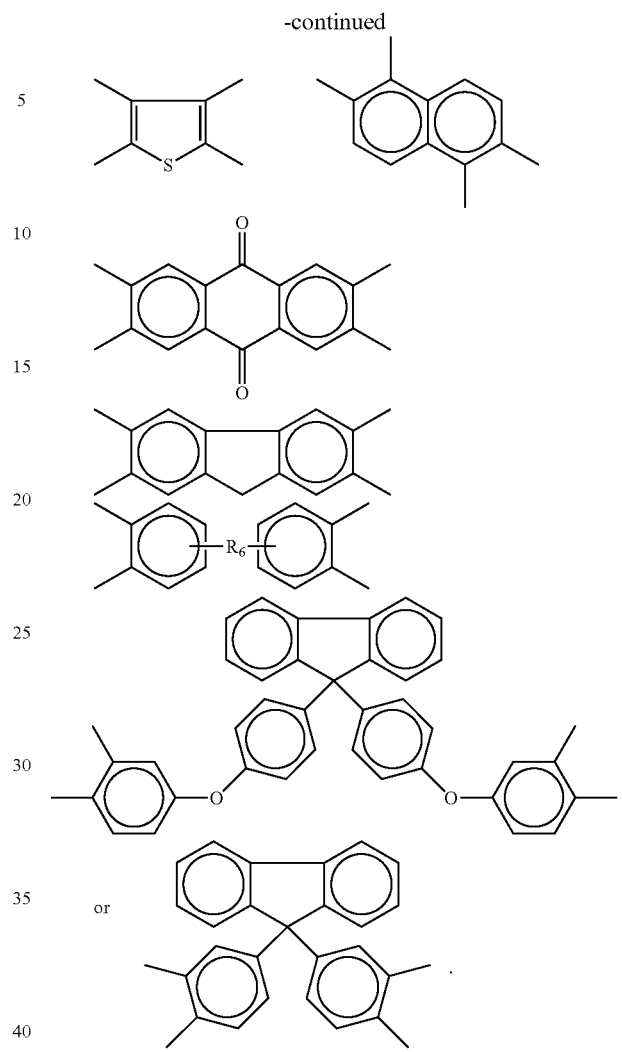

11. The polyhydroxyamide of claim 8, wherein $R_7$ is —H

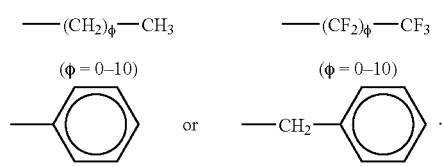

12. The polyhydroxyamide of claim 10, wherein $R_8$ is an alkyl radical having 1 to 10 carbon atoms or an aryl radical.

13. The polyhydroxyamide of claim 1, wherein each $Z_1$ and $Z_2$ are independently:

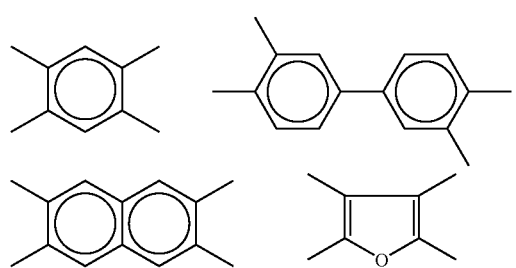

14. A polybenzoxazole, wherein the polybenzoxazole is produced by cyclization of hydroxyamide units of a polyhydroxyamide of claim 1.

15. An electronic component comprising a coat comprising the polybenzoxazole of claim 14.

16. The electronic component of claim 15, wherein the electrical component is a memory chip, logic chip, flip chip, flash memory, multichip module, circuit board, microprocessor or embedded DRAM.

17. A process for the preparation of a polyhydroxyamide of claim 1, the process comprising;
  a) reacting at least one of a compound of the formula $Z_1(NH_2)_2(OH)_2$ or $Z_2(NH_2)_2(OH)_2$ with at least one of a compound of the formula $Y_1(COCl)_2$ or $Y_2(COCl)_2$,
  b) reacting the product resulting from step a) with a compound of the formula $X(QOH)_2$ or $X(QNH_2)_2$, and
  c) optionally reacting the product obtained from step b) with a precursor compound for formula $A_1$, $A_2$ and/or $A_3$, wherein
$Z_1$, $Z_2$, $Y_1$, $Y_2$, $A_1$, $A_2$, $A_3$ and X are defined as in claim 1.

18. A process for the preparation of a polybenzoxazoles of claim 1, wherein a polyhydroxyamide of claim 1 is subjected to a thermal treatment.

19. The process of claim 18, wherein the thermal treatment is effected at 250–450° C.

20. The process of claim 18, wherein the thermal treatment is effected for 0.5–3 hours.

21. A process for coating a substrate, the process comprising applying at least one polyhydroxyamide of claim 1 to the substrate and heating the coated substrate in order to form a polybenzoxazole coat on the substrate.

22. The process of claim 21, wherein the polyhydroxyamide is dissolved in an organic solvent before application to the substrate.

23. The process of claim 22, wherein the organic solvent is acetone, cyclohexanone, diethylene glycol monoethyl ether, diethylene glycol diethyl ether, N-methylpyrrolidone, γ-butyrolactone, ethyl lactate, tetrahydrofuran, methyl acetate or a mixture thereof.

24. The process of claim 21, wherein the polyhydroxyamide is applied to the substrate using a spin-coating treatment.

25. The process of claim 21, wherein the substrate is a silica, silicon nitride, titanium, titanium nitride, tantalum or tantalum nitride surface.

26. The process of claim 21, wherein the substrate is part of an electronic component.

27. A composition comprising a polyhydroxyamide of claim 1 and an organic solvent.

28. The composition of claim 27, wherein the composition has a polyhydroxyamide content, based on the total composition, of 10–50% by weight.

29. The polyhydroxyamide of claim 1, wherein, in X, wherein $a=0-10$ and $\beta=0-10$.

30. The process of claim 18, wherein the thermal treatment is effected at 300–400° C.

31. The process of claim 18, wherein the thermal treatment is effected at 300–350° C.

32. The process of claim 18, wherein the thermal treatment is effected for 1–3 hours.

33. The process of claim 18, wherein the thermal treatment is effected for 1–2 hours.

34. The composition of claim 27, wherein the organic solvent is acetone, cyclohexanone, diethylene glycol monoethyl ether, diethylene glycol diethyl ether, N-methylpyrrolidone, γ-butyrolactone, ethyl lactate, tetrahydrofuran, methyl acetate or a mixture thereof.

35. The composition of claim 27, wherein the polyhydroxyamide content is 20–40% by weight.

36. The composition of claim 27, wherein the polyhydroxyamide content is about 20% by weight.

* * * * *